(12) United States Patent
Kuraki et al.

(10) Patent No.: US 8,170,208 B2
(45) Date of Patent: May 1, 2012

(54) IMAGE DECRYPTING APPARATUS, IMAGE ENCRYPTING APPARATUS, AND IMAGE DECRYPTING METHOD

(75) Inventors: Kensuke Kuraki, Kawasaki (JP); Jun Takahashi, Kawasaki (JP); Shohei Nakagata, Kawasaki (JP); Taizo Anan, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 752 days.

(21) Appl. No.: 12/232,901

(22) Filed: Sep. 25, 2008

(65) Prior Publication Data

US 2009/0220076 A1 Sep. 3, 2009

(30) Foreign Application Priority Data

Feb. 28, 2008 (JP) .................................. 2008-048589

(51) Int. Cl.
*G06F 21/00* (2006.01)
*G09C 5/00* (2006.01)

(52) U.S. Cl. ................................ 380/54; 283/17; 283/73

(58) Field of Classification Search .................... 380/54; 283/17, 73
See application file for complete search history.

(56) References Cited

U.S. PATENT DOCUMENTS

| 2004/0042634 A1* | 3/2004 | Cazier ............................ 382/100 |
| 2007/0104349 A1 | 5/2007 | Myodo et al. |
| 2008/0317348 A1* | 12/2008 | Saito ............................. 382/182 |

FOREIGN PATENT DOCUMENTS

| CN | 1992794 A | 7/2007 |
| JP | 08-179689 | 7/1996 |
| JP | 2938338 | 6/1999 |
| JP | 2006-086906 | 3/2006 |
| JP | 2007-110606 | 4/2007 |
| KR | 10-2005-0111734 | 11/2005 |
| WO | 2007/108795 | 9/2007 |

OTHER PUBLICATIONS

Korean Office Action for corresponding Korean Application 10-2008-0121287; mailed Feb. 25, 2010.
Chinese Office Action issued Mar. 23, 2011 in corresponding Chinese Patent Application 200810166569.X.

* cited by examiner

*Primary Examiner* — Matthew Smithers
(74) *Attorney, Agent, or Firm* — Staas & Halsey LLP

(57) ABSTRACT

When a decrypting apparatus receives an encrypted image, the apparatus detects the state of the encrypted image and determines whether the encrypted image is an image passed through only a digital medium or an analog medium, according to the state of the encrypted image. When the encrypted image is determined to be the image passed through only the digital medium, the decrypting apparatus switches to perform a digital decryption process and, when the encrypted image is determined to be the image passed through the analog medium, the decrypting apparatus switches to perform an analog decryption process.

30 Claims, 20 Drawing Sheets

INPUT IMAGE → ENCRYPTION KEY / EXCHANGE OF MICRO AREAS → SCRAMBLED IMAGE

TRIANGULAR MICRO AREAS

MICRO AREAS HAVING DIFFERENT SIZES AND SHAPES (A) → (B) COMPRESSION → 0110100010110001...

(A) 0110100010110001... ⇒ (B)

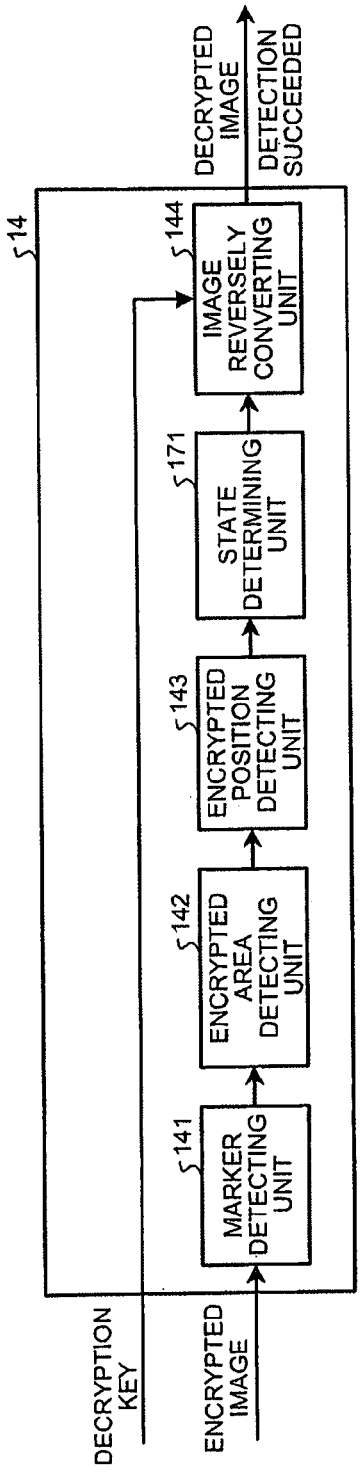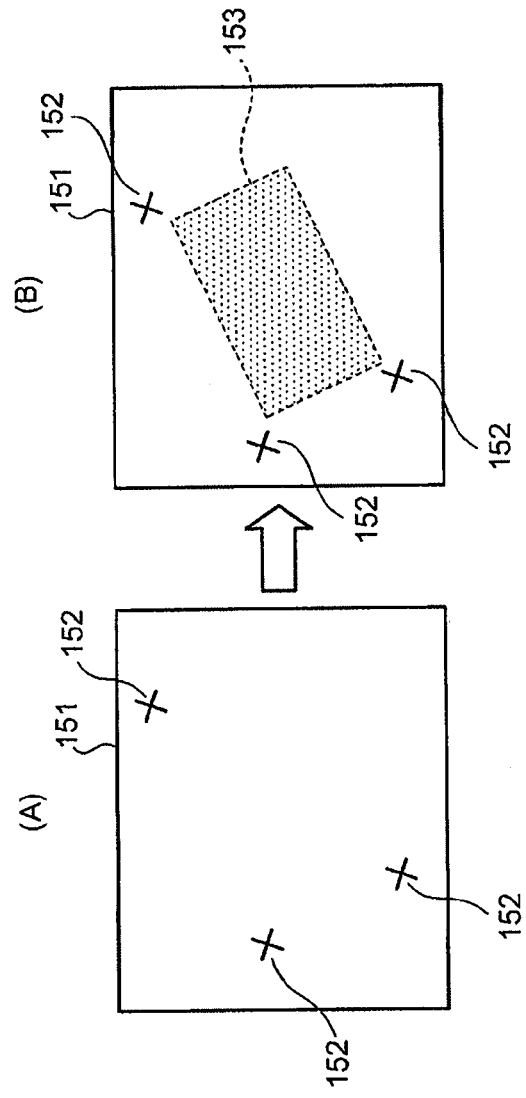

RANDOM DOTS
3301

REGULAR DOTS
3302

LINES
3303

$B_i'$ (DUMMY SIGNAL) $= A_i \text{ xor } B_i$

IMAGE DECRYPTING APPARATUS, IMAGE ENCRYPTING APPARATUS, AND IMAGE DECRYPTING METHOD

BACKGROUND OF THE INVENTION

1. Field of the Invention

The present invention relates to an image decrypting apparatus, an image encrypting apparatus, and an image decrypting method that decrypt an encrypted image using a decryption key.

2. Description of the Related Art

Leakage of confidential information is a serious problem in the advancement of computerization of the general society and development of a technique that prevents the leakage of the information is desired. For example, as to digital data, a technique has been developed of encrypting data to prevent the content of the data from being viewed when the data is delivered to a third party. The technique is already utilized as a useful means of preventing information leakage.

On the other hand, a technique of preventing information leakage of a printed item printed on a paper medium, etc., has not been fully developed yet and any example thereof is not present. It is also actually said that substantially a half of the information leakage occurs from printed items. Therefore, similarly to the case of digital data, development of a technique of preventing information leakage from printed items is an urgent mission.

Specific examples for which a measure against the information leakage from the printed items is desired include a bill for purchase of merchandise, a statement for a credit card, etc., a clinical chart of a hospital, a report card of a school, and a name list. The present invention is usable as a technique of preventing information leakage by encryption and decryption of important portions of, for example, each of these examples.

Conventionally, a known example that handles encryption of a printed item can be, for example, a technique disclosed in Japanese Patent Application Laid-Open Publication No. 8-179689. According to this '689 publication: an entire original image is divided into a plurality of blocks; images respectively of the divided blocks are rearranged based on a parameter obtained from a password input (encryption key); the image of each of the blocks designated by the parameter are black/white-inversed and mirror-inversed; and, thereby, the original image is encrypted. When the encrypted image is decrypted, a frame for positioning is added to the image in the outer periphery thereof and another password (decryption key) is input. Thereafter, the original image is recovered by performing the encryption in a reverse manner.

Another convention technique can be, for example, a technique of embedding binary data as an image in a printed item, as shown in Japanese Patent Publication No. 2938338. The visualization as an image in this conventional technique is realized by representing the binary data using black-and-white squares each having a designated size and arranging the squares in a matrix. In addition, the printed item is added with a symbol for positioning at a designated position in the matrix such that the position that is visualized as an image can be known in decryption. Using this positioning symbol as the criterion enables shooting of the image using a scanner or a camera and, thereby, decryption of the information embedded.

In the above conventional techniques, a process is performed of decrypting an encrypted image output on an analog medium by printing, etc., into the original image using a reverse procedure of the encryption. However, when the contour of the encrypted image is smeared due to smears of ink and optical deformation resulted from printing a digital image and reading the image using an optical apparatus such as a camera or a scanner, the original pixel values can not be recovered even when the reverse process is performed. Therefore, a problem has arisen that the image quality of the decrypted image is degraded.

As to the image in the encrypted area, this image is encrypted using a method of dividing the image into a plurality of blocks and rearranging (black/white inversion, mirror inversion, and upside-down inversion) the blocks. However, it can be considered that the image present before the encryption is speculated from the feature of the image of each block of the divided blocks when the blocks are only rearranged. Therefore, a problem has arisen that the security needs to be enhanced.

SUMMARY

It is an object of the present invention to at least partially solve the problems in the conventional technology.

According to an aspect of the present invention, an image decrypting apparatus is for decrypting an encrypted image using a decryption key. The image decrypting apparatus includes an encrypted image determining unit that detects a state of the encrypted image and determines whether the encrypted image is an image passed through only a digital medium or an image passed through an analog medium according to the state of the encrypted image; and a decryption process selecting unit that selects a digital decryption process when the encrypted image is determined to be the image passed through only the digital medium, the decryption process selecting unit selecting an analog decryption process when the encrypted image is determined to be the image passed through the analog medium.

According to another aspect of the present invention, an image encrypting apparatus is for encrypting an image to be decrypted by the image decrypting apparatus according to the present invention. The image encrypting apparatus includes a determination flag adding unit that adds to the encrypted image a determination flag, wherein the determination flag disappears after the image passes through an analog medium.

According to still another aspect of the present invention, a method for decrypting an encrypted image using a decryption key in an image decrypting apparatus includes detecting a state of the encrypted image; determining whether the encrypted image is an image passed through only a digital medium or an image passed through an analog medium according to the state of the encrypted image; and selecting a digital decryption process when the encrypted image is determined to be the image passed through only the digital medium, and selecting an analog decryption process when the encrypted image is determined to be the image passed through the analog medium.

According to still another aspect of the present invention, an image encrypting apparatus is for encrypting an image using an encrypting key. The image encrypting apparatus includes an encryption area designating unit that designates a partial area to be encrypted from the image; a dummy signal adding unit that adds a dummy signal to the image; an image converting unit that converts the partial area designated by the encryption area designating unit into a processed image based on the encryption key; and a pixel value converting unit that creates a converted image by regularly converting the pixel value of the processed image converted by the image converting unit to enable the position of the partial area to be designated.

According to still another aspect of the present invention, an image decrypting apparatus is for decrypting the image encrypted by the image encrypting apparatus according to the present invention. The image decrypting apparatus includes a dummy signal removing unit that removes the dummy signal from the encrypted image.

According to still another aspect of the present invention, an image encrypting apparatus for encrypting an image using an encryption key includes an encrypting area designating unit that designates a partial area to be encrypted from the image; an image converting unit that converts the partial area designated by the encryption area designating unit into a processed image based on the encryption key; and a marker adding unit that adds a positioning marker that has a periodic nature to specify the position of the partial area.

According to still another aspect of the present invention, a method for encrypting an image using an encryption key in an image encrypting apparatus includes designating a partial area to be encrypted from the image; converting the designated partial area into a processed image based on the encryption key; and adding a positioning marker that has a periodic nature to specify the position of the partial area.

According to still another aspect of the present invention, a computer program product causes a computer to perform the method according to the present invention.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 17 is a block diagram of the configuration of the decrypting apparatus according to the first embodiment;

FIG. 18 depicts a process of detecting the encrypted area from the positioning marker;

DETAILED DESCRIPTION OF THE PREFERRED EMBODIMENTS

Referring to the accompanying drawings, description will be given in detail for an embodiment of an image decrypting apparatus, an image encrypting apparatus, an image decrypting method, and an image decrypting program according to the present invention.

In the following embodiment, description will be given for the overview and features of each of an image decrypting apparatus and an image encrypting apparatus according to a first embodiment, and the configuration and the process flow of each of the image decrypting apparatus and the image encrypting apparatus, in this order, and description will finally be given for the effect according to the first embodiment.

Figure 1:
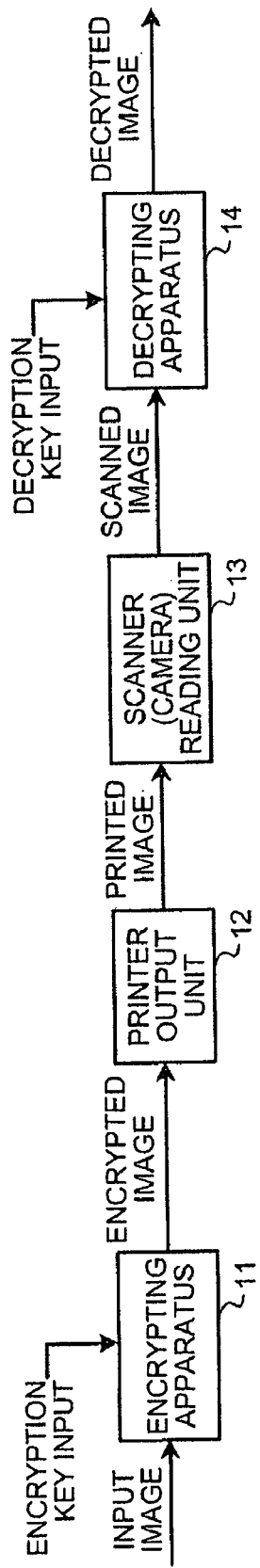
FIG. 1 is a diagram of the overview of an encrypting apparatus according to a first embodiment.
Figure 2:
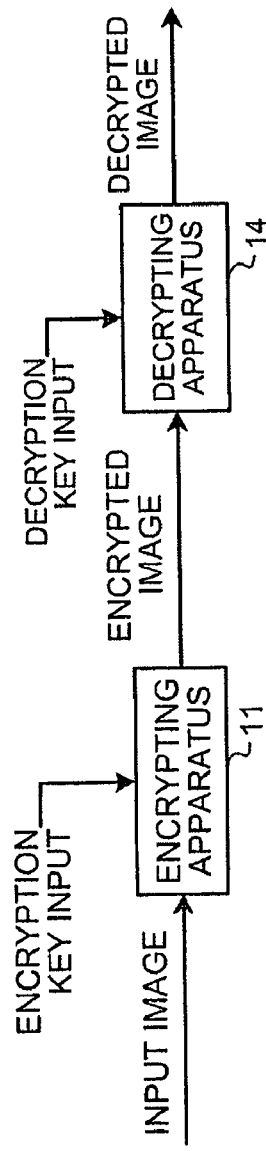
FIG. 2 is a diagram of the overview of a decrypting apparatus according to the first embodiment.
Figure 3:
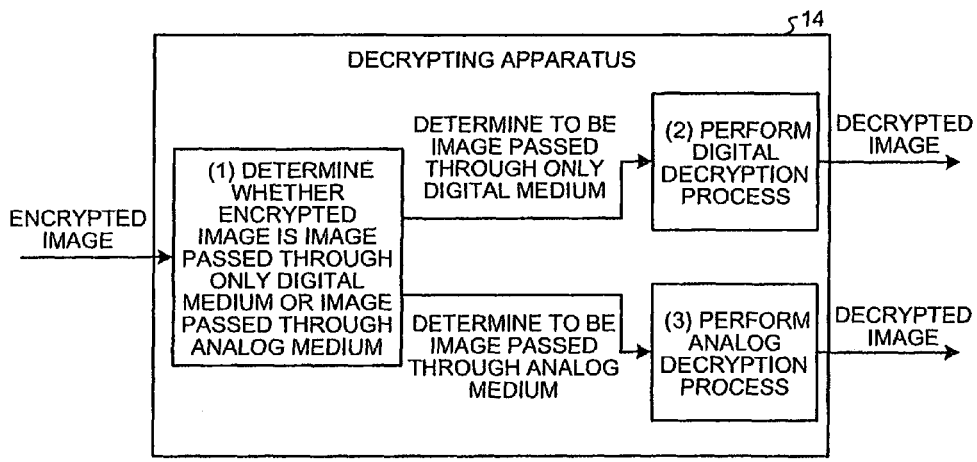
FIG. 3 is a diagram of the overview and features of the decrypting apparatus according to the first embodiment.

Referring to FIGS. 1 to 3, description will be given for the overview and the features of each of the image encrypting apparatus and the image decrypting apparatus according to the first embodiment. FIG. 1 is a diagram of the overview of the encrypting apparatus according to the first embodiment. FIG. 2 is a diagram of the overview of the decrypting apparatus according to the first embodiment. FIG. 3 is a diagram of the overview and the features of the decrypting apparatus according to the first embodiment.

As shown in FIGS. 1 and 2, in the first embodiment, an encrypted image encrypted by an encrypting apparatus 11 is input into a decrypting apparatus 14 through an analog medium or a digital medium and the encrypted image is decrypted.

Referring to FIG. 1, description will be given for an example of the case where the encrypted image passes through an analog medium. As shown in FIG. 1, the encrypting apparatus 11 outputs to a printer output unit 12 an encrypted image formed by partially encrypting the digital image based on a digital image input and an encryption key.

The printer output unit 12 outputs on a printable analog medium such as paper the digital image encrypted by the encrypting apparatus 11. A scanner (camera) reading unit 13 reads a printed image output by the printer output unit 12 using a scanner or a camera.

The decrypting apparatus 14 receives the printed image output by the printer output unit 12 (hereinafter, "image passed through the analog medium"). The decrypting apparatus 14 obtains a decrypted image using the received image and a decryption key input. Only when this decryption key input is correct, the encrypted image can be properly decrypted and information hidden by the encryption by the encrypting apparatus 11 can be viewed.

Referring to FIG. 2, description will be given for an example of the case where the encrypted image passes through only a digital medium. In the encrypting process and the decryption process shown in FIG. 2, as to the digital image encrypted by the encrypting apparatus 11, the decrypted image thereof can also be obtained by inputting the image that passes through only the digital medium and no printer and no scanner (hereinafter, "image passed through only the digital medium") into the decrypting apparatus 14 as an electronic document image as it is.

The "image passed through the analog medium" and the "image passed through only the digital medium" that the decrypting apparatus 14 receives differ in their image state. For example, for the image passed through the analog medium, the contour thereof may be smeared by smears of ink and optical deformation when an optical apparatus such as a camera and a scanner reads this image, whereas the degradation of the image is mild for the image passed through only the digital medium. The present invention is mainly featured in that: the state of an encrypted image is detected; whether the image is an "image passed through an analog medium" or an "image passed through only the digital medium" is determined; and a digital image decryption process and an analog decryption process are switched between them to be performed according to the determination result.

Description will be given for the main feature in detail. As shown in FIG. 3, when the decrypting apparatus 14 receives an encrypted image, the decrypting apparatus 14 detects the state of the encrypted image and determines whether the encrypted image is an image passed through only the digital medium or an image passed through the analog medium according to the state of the encrypted image (see (1) of FIG. 3). More specifically, the decrypting apparatus 14 detects the state of the encrypted image from the degree of degradation of a positioning marker added to the image in its encrypted area, the positional relation of four corners of the encrypted area, and the intervals of micro areas and, thereby, the decrypting apparatus 14 determines whether the encrypted image is the image passed through only the digital medium or the image passed through the analog medium.

When the encrypted image is determined to be the image passed through only the digital medium, the decrypting apparatus 14 selects the digital decryption process (see (2) of FIG. 3). When the encrypted image is determined to be the image passed through the analog medium, the decrypting apparatus 14 selects the analog decryption process (see (3) of FIG. 3). More specifically, when the decrypting apparatus 14 decrypts the image passed only the digital medium, the decrypting apparatus 14 performs reverse operation of the encryption. When the decrypting apparatus 14 decrypts the image passed the analog medium, the decrypting apparatus 14 performs a process that decrypts the encrypted image using processes such as a process of improving the degradation of the image quality and a process of recovering, using an interpolating process, each pixel value whose value is varied by a pixel value converting unit.

As above, the decrypting apparatus 14 needs to selects the process of improving the degradation of the image quality and the process of recovering, using the interpolating process, each pixel value whose value is changed by the image converting unit because, for the image passed through the analog medium, the contour of the image is smeared due to the smears of ink and the optical deformation since the digital image is printed and the printed image is read by an optical apparatus such as a camera or a scanner. On the other hand, for the image passed through only the digital medium, because the image has no degradation of the image due to the smears of ink and the optical deformation, the decrypting apparatus 14 performs the reverse operation of the encryption and selects the process of decrypting the image. In this manner, the decrypting apparatus 14 selects its decryption process and, thereby, improves the image quality of the decrypted image.

Figure 4:
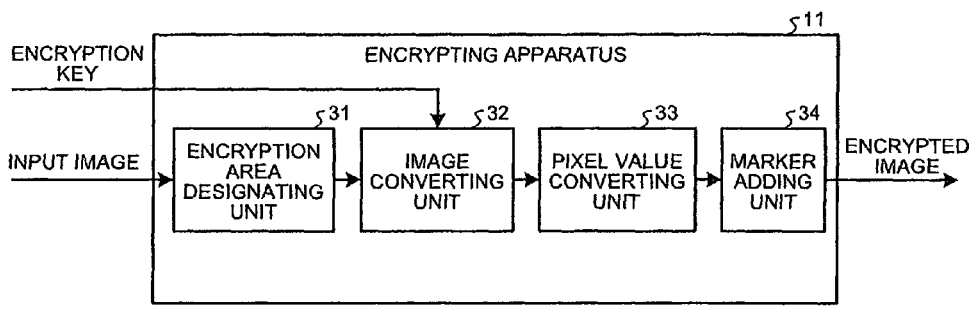
FIG. 4 is a block diagram of the configuration of the encrypting apparatus according to the first embodiment.

Referring to FIG. 4, description will be given for the configuration of the encrypting apparatus 11 shown in FIG. 1. FIG. 4 is a block diagram of the configuration of the encrypting apparatus according to the first embodiment. As shown in FIG. 4, the encrypting apparatus 11 includes an encryption area designating unit 31, an image converting unit 32, a pixel value converting unit 33, and a marker adding unit 34. Description will be given below for each of these components.

Figure 5:
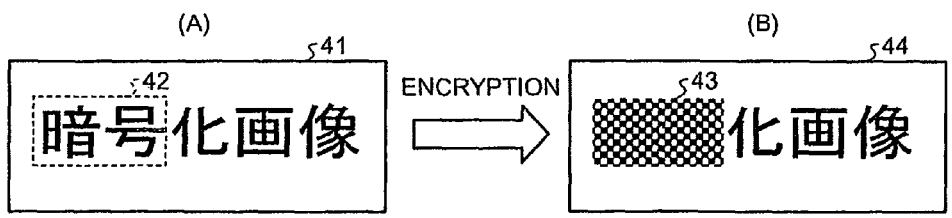
FIG. 5 depicts an example of selecting an area to be encrypted.

The encryption area designating unit 31 selects an area to be encrypted from an input image that includes the area that is desired to be encrypted. More specifically, as shown in (A) of FIG. 5, the encryption area designating unit 31 selects an area 42 to be encrypted from a digital image (input image) 41 that includes the area that is desired to be encrypted. This area 42 is converted into a converted image 43 as shown in (B) of FIG. 5 by processes respectively of the image converting unit 32 and the pixel value converting unit 33 both described later and, thereby, the digital image 41 is converted into an encrypted image 44 that includes the converted image 43.

The image converting unit 32 inputs the area 42 to be encrypted and an encryption key, and the image converting unit 32 visually converts the image in the area 42 to be encrypted using a converting method that corresponds to the encrypting key. A conversion parameter for this case is created using binary data obtained from the encryption key of the input.

Figure 6:
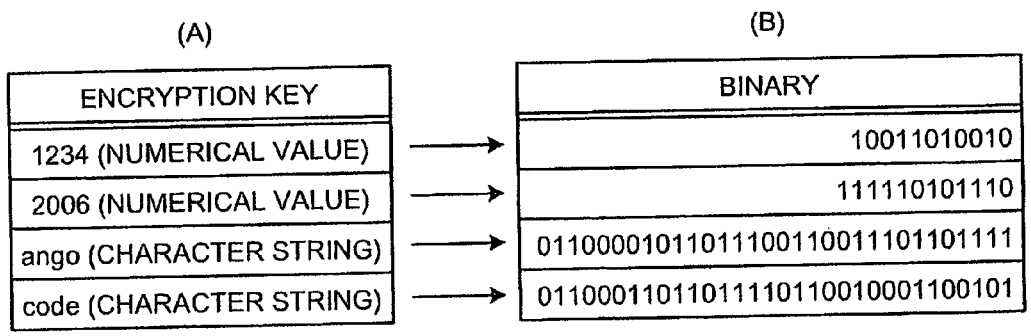
FIG. 6 depicts exemplary inputs of an encryption key.

Description will be given for an exemplary input of the encryption key. FIG. 6 depicts an example of the binary data generated by the encryption key. As exemplified in (A) and (B) of FIG. 6, a numerical value "1234" as an encryption key is input as binary data "100011010010", and a character string "ango" is input as binary data "01100001011011100110011101101111".

Two examples of the image converting method will be shown, that are a process of dividing an image into micro areas and rearranging the micro areas (that is referred to as "scrambling process") and a converting method by performing a compressing process to an image.

Figure 7:
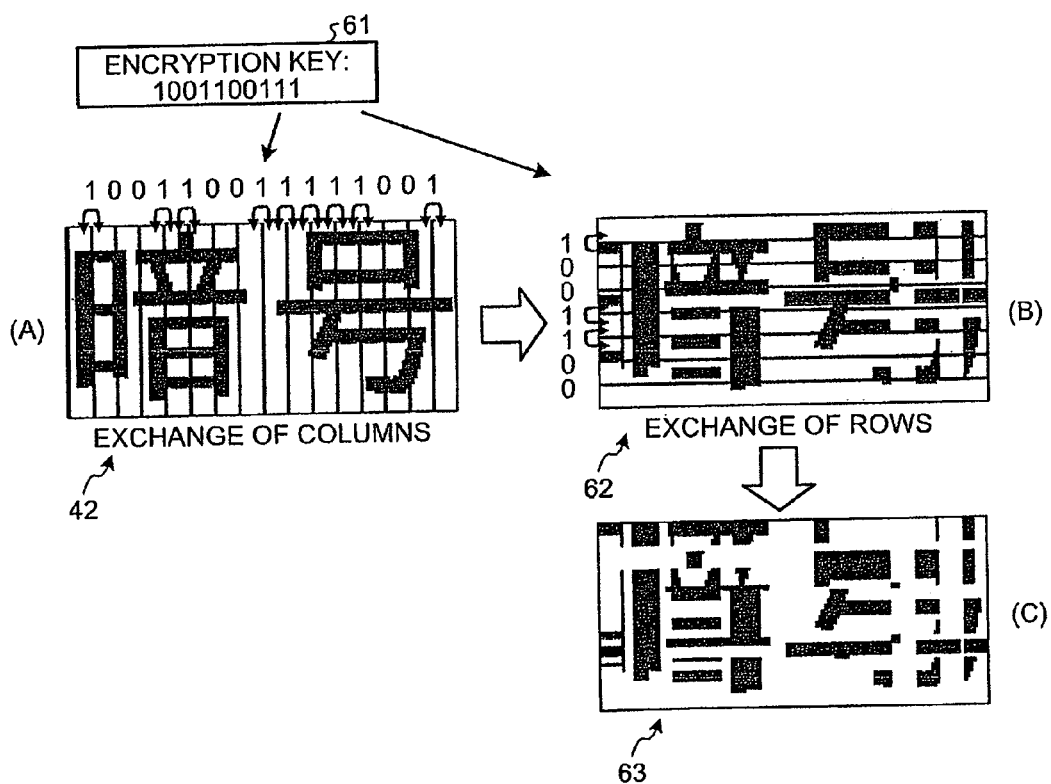
FIG. 7 depicts an example of a scrambling process in an image converting unit.

FIG. 7 depicts an example of the scrambling process in the image converting unit. As shown in FIG. 7, in the scrambling process, the image of a selected area 42 is divided into micro areas having a specific size and the micro areas are rearranged according to binary data obtained from an encryption key.

As shown in (A) of FIG. 7, the area 42 selected by the encryption area designating unit 31 is divided in the longitudinal direction, and each bit of the binary string of an encryption key 61 is sequentially correlated with the bounds of the divided area 42 from the left. A process of exchanging adjacent two divided strings for each other when a bit is "1" and performing no operation when a bit is "0", is sequentially performed from the left. When the number of bits in the binary string is insufficient for the number of the dividing bounds, a same binary string is repeated at the position at which the bits becomes insufficient and the exchanging process is performed to the right end of the area 42.

As shown in (B) of FIG. 7, an image area 62 for which the exchanging process is performed is divided in the lateral direction, each bit of the binary string of the encryption key 61 is sequentially correlated with the bounds of a divided image area 62 from above, and a same exchanging process as that performed for the longitudinal division is sequentially performed for each row from above.

As shown in (C) of FIG. 7, as the result of the exchanging process performed to each divided image, a scrambled image 63 is obtained that is a processed image obtained by performing the scrambling process to the original area 42. This scrambling may be performed twice or more for both the lateral direction and the longitudinal direction as an expanded method of this exemplary scrambling process. The size of each divided area may also be varied in the second exchanging and later ones. These expanded methods are especially effective as a means of preventing creation of a completely same processed image from a different encryption key when the size of the input image is small and the bit length of the encryption key is long.

Figure 8:
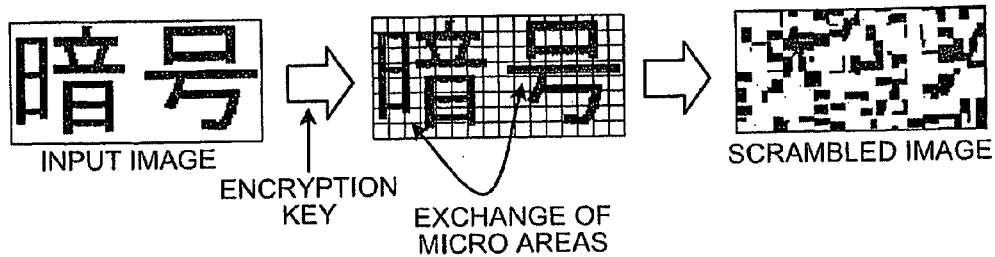
FIG. 8 depicts another example of the scrambling process in the image converting unit.

A method of exchanging pixels for each other by each micro area as shown in FIG. 8 may be performed as a scrambling processing method that is different from the scrambling process described referring to FIG. 7. FIG. 8 depicts another example of the scrambling process in the image converting unit. That is, as shown in FIG. 8, an input image is divided into micro areas each having a rectangular shape and the divided micro areas are exchanged for each other. Thereby, the number of the times of scrambling becomes more than that of the method by the above exchanging in the lateral direction and the longitudinal direction (rows and columns) and, therefore, the strength of the encryption can be increased.

Figure 9A:
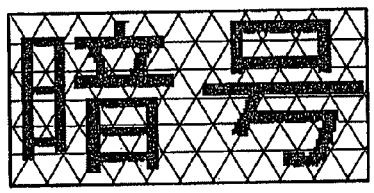
FIGS. 9A and 9B depict examples of deformation of the shape of a micro area in the scrambling process.
Figure 9B:
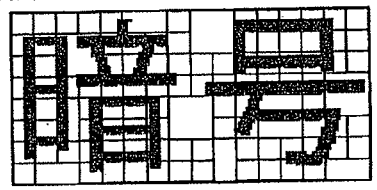

In addition to the square shown in FIG. 8, for example, a triangular shape as shown in FIG. 9A may be used as the shape of each micro area in the scrambling process. As shown in FIG. 9B, micro areas respectively having different shapes and sizes may concurrently be present.

Figure 10:
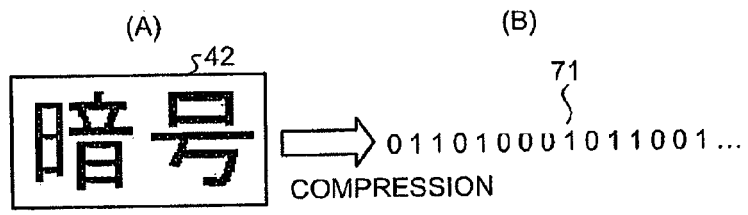
FIG. 10 depicts a compressing process in the image converting unit.

Referring to FIG. 10, description will be given for a conversion method performed by processing an image by compression. FIG. 10 depicts a compressing process in the image converting unit. As shown in FIG. 10, when the digital image 41 is a binary image, the image of the area 42 selected by the encryption area designating unit 31 is compressed as shown in (A) of FIG. 10 and, thereby, a binary string 71 as shown in (B) of FIG. 10 is created. Various compression schemes such as run-length compression used for transfer of binary image data in a facsimile apparatus and Joint Bi-level Image experts Group (JBIG) that is a standard compression scheme of a binary image are applicable as the compressing method in this case.

Figure 11:
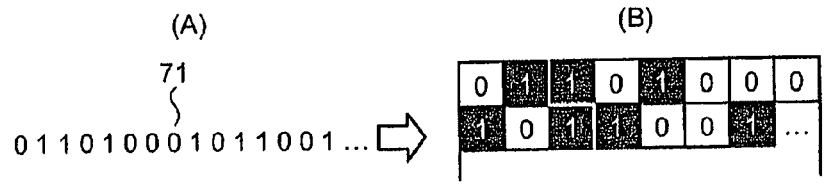
FIG. 11 depicts a process of visualizing as an image converted data.

Referring to FIG. 11, description will be given for a process of visualizing converted data as an image. FIG. 11 depicts the process of visualizing converted data as an image. Following the compression of the area 42 as shown in FIG. 10, a square image (processed image) 81 is created by expanding each bit of the binary string 71 that is converted and compressed data into, when the bit is "0", a "white" square and, when the bit is "1", a "black" square each having a designated size as shown in (B) of FIG. 11, and the square image 81 is arranged in the area 42 of the image to be encrypted as a black and white squire image 81.

When the converted and compressed data (binary string 71) is arranged such that the data is accommodated in the image of the selected area 42, the size of the square image 81 is dependent on the compression ratio of the selected area 42. For example, when the compression ratio is ¼ or less, the size of the square image 81 is 2×2 pixels and when the ratio is 1/16 or less, the size is up to 4×4 pixels.

On the other hand, when the size of the square image 81 is designated in advance and the compressed data is desired to be accommodated in the image of the selected area 42, a compression ratio that depends on the size of the square image 81 needs to be achieved in the first image compressing process. For example, when a square is set to have a size of 4×4 pixels, a compression ratio of 1/16 or larger is necessary. In this case, a method of compressing by reducing information of the selected area 42 in advance and a method that employs an irreversible compression scheme are effective.

Due to the above encrypting process of visualizing the compressed data as an image by expanding the data, for example, expanded white and black blocks can be recognized even when the encrypted image is read by a low resolution camera. Therefore, the encrypted image can be correctly decrypted.

Returning to the description of FIG. 4, the pixel value converting unit 33 converts pixels of the scrambled image 63 converted by the image converting unit 32 taking constant intervals to cause the converted image 43 to have a stripe pattern of substantially gratings. More specifically, the pixel value converting unit 33 converts at constant intervals the pixels of the scrambled image 63 for which the area 42 is scrambled by the image converting unit 32 to cause the encrypted image 44 to have a stripe pattern of substantially gratings as a whole.

Figure 12:
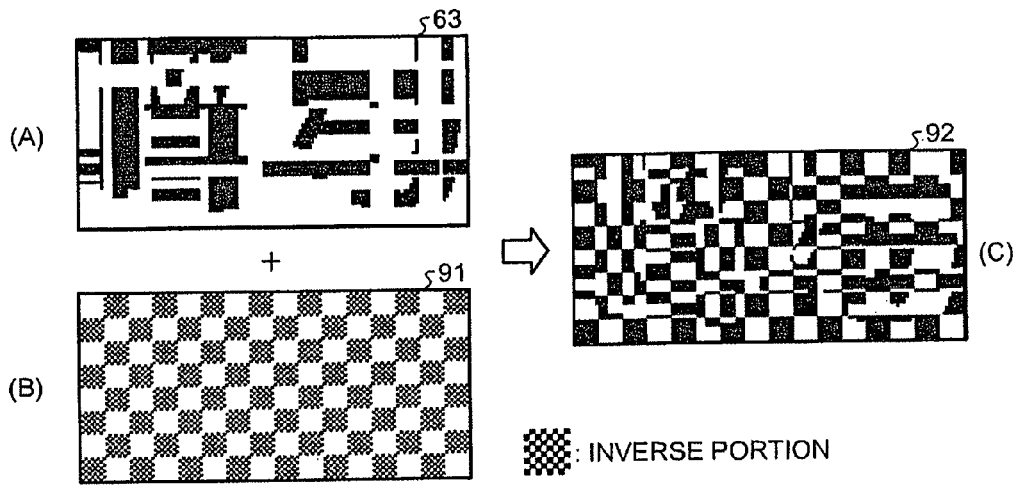
FIG. 12 depicts exemplary pixel value converting processes (Part I) in the pixel value converting unit.

For example, as shown in FIG. 12, by performing a process by converting the scrambled image 63 shown in (A) of FIG. 12 only in the colored parts of a checker pattern image 91 shown in (B) of FIG. 12 thereof, a converted image 92 is obtained that is formed by the encrypted image 44 as shown in (C) of FIG. 12 that has a stripe pattern of substantially gratings as a whole. Thereby, the stripe pattern created is used to detect a detailed position of each pixel in the encrypted area when the encrypted image 44 is decrypted.

For the series of processes, another conversion may be performed. For example, the process of inverting the pixel values may be a process of adding a designated value. The checker pattern image 91 shown in (B) of FIG. 12 has substantially the same size as that of the scrambled image 63 shown in (A) of FIG. 12. However, by using a size that is smaller than the scrambled image 63, only the central portion other than the periphery of the scrambled image 63 may be processed by inverting.

Figure 13A:
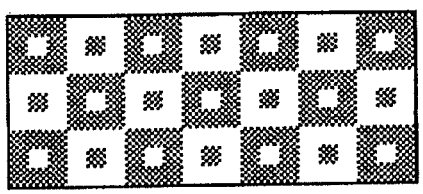
FIGS. 13A to 13C depict the exemplary pixel value converting processes (Part II) in the pixel value converting unit.
Figure 13B:
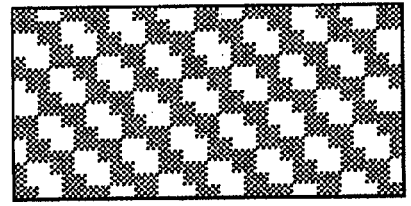
Figure 13C:
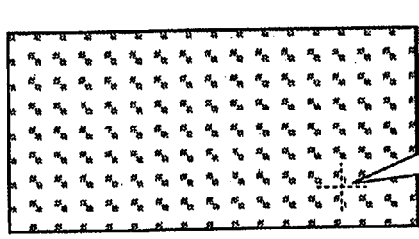

The area 42 that converts the pixel values may be applied with various shapes as shown in FIGS. 13A to 13C. The pixel value conversion is a process that aims at detecting at high precision the positions of bounds each between the micro areas. Therefore, for example, it can be considered that the pixel values are converted only in the bound portions as shown in FIG. 13A. By performing the pixel value conversion by shifting a little to the micro areas as shown in FIG. 13B, the bounds each between a converted portion and a non-converted portion appear at smaller intervals, therefore, the pixel positions of the encrypted image 44 in the decryption process can be detected in more detail.

As shown in FIG. 13C, when the pixel value conversion is performed only to the portions each having an intersection of bounds of the micro areas, the degradation of the image quality caused by reading an image printed on paper, etc., by a scanner or a camera can be minimized. When the shape of each micro area is not square having an equalized size and is a triangular shape (FIG. 9A) or different sizes and shapes are concurrently present (FIG. 9B) as shown in FIGS. 9A and 9B, the pixel value conversion needs to be performed in a method that is not limited to the above conversion example and that depends on the shape.

Returning to the description of FIG. 4, of the four corners of the converted image 92 that is processed by conversion by the pixel value converting unit 33, the marker adding unit 34 creates the encrypted image 44 by adding a positioning marker to, for example, each of the three corners except the lower-right corner. For example, the marker adding unit 34 disposes the positioning marker to specify the position of the encrypted area 42 to the three corners except the lower-right corner of the four corners of the converted image 92.

Figure 14A:
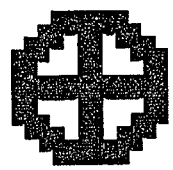
FIGS. 14A to 14D depict exemplary positioning markers used in an encrypting process.
Figure 14B:
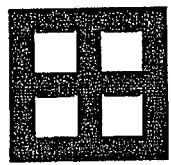
Figure 14C:
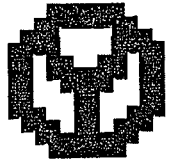
Figure 14D:
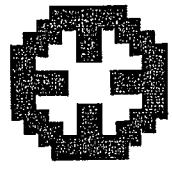
Figure 41A:
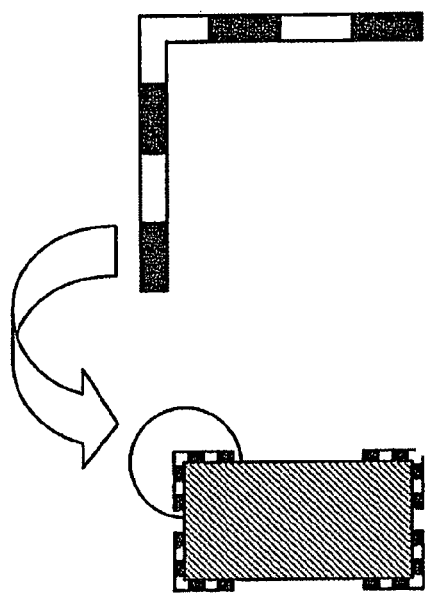
FIGS. 41A and 41B respectively depict examples of a positioning marker that has periodical nature.
Figure 41B:
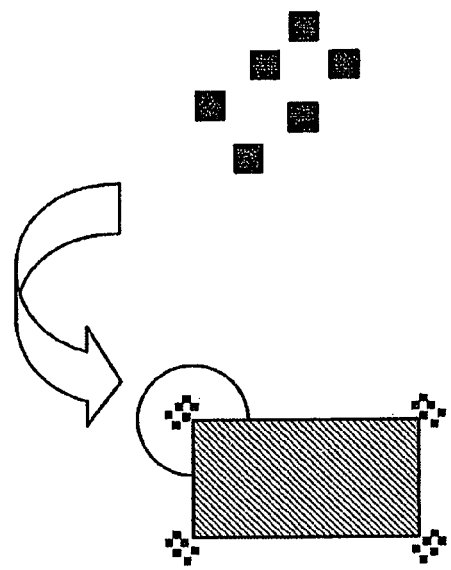

Referring to FIGS. 14A to 14D, description will be given for an example of the positioning marker used in the encrypting process. As shown in FIGS. 14A to 14D, the positioning marker has a shape of a cross in a circle as shown in FIG. 14A. To more widely express the shape of the positioning marker, the shape may be the one that configured by a solid line circle or a polygon and a plurality of lines that cross the circle or the polygon. Examples of this type can be the one having the shape of a Chinese character "Ta" as the positioning marker of FIG. 14B, the one having three radial lines extended from the center to the circumference as the positioning marker of FIG. 14C, and the one having lines that do not fully extend as the positioning marker of FIG. 14D. Positioning markers that have periodic nature as respectively shown in FIGS. 41A and 41B may be used. When a positioning marker as shown in FIG. 41A or 41B is used, identification of the position of a positioning marker from the entire image by frequency conversion such as Fourier transform or Gabor conversion is enabled.

The configuration of the color of a positioning marker may be such that, in the simplest case, the background is white and the foreground is black. However, the configuration is not limited to this, and the configuration does not cause any problem when the configuration is changed as appropriate corresponding to the color (pixel value) distribution of the converted image 92. A method can be considered of forming a positioning marker not by designating determined colors respectively for the background and the foreground but by inverting the pixel values in the foreground leaving the color of the background as that of the digital image 41, etc. By doing this, encryption of an image can be performed with the input image information of the positioning marker portion being retained.

Figure 15:
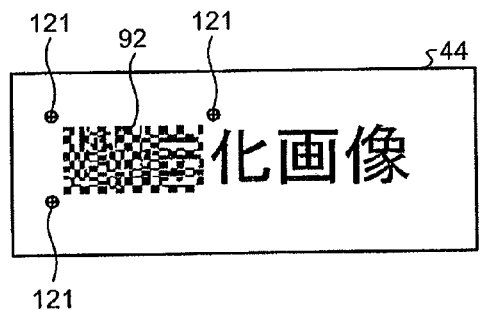
FIG. 15 depicts an exemplary encrypted image.

Referring to FIG. 15, description will be given for an example of the encrypted image. That is, the encrypted image 44 as shown in FIG. 15 is finally created due to the processing by the encrypting apparatus 11. The created encrypted image 44 includes the converted image 92 and a positioning marker 121. When the image converting unit 32 uses the "process of rearranging the micro areas (scrambling process)", the encrypting process can be applied not only to a binary image but also to a gray scale or color image.

Figure 16A:
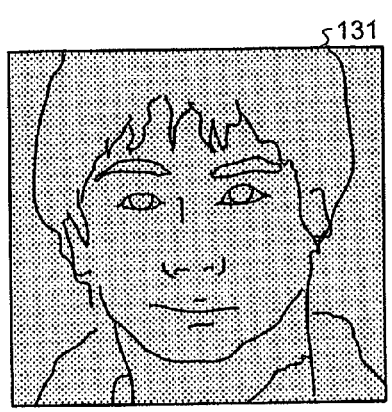
FIGS. 16A and 16B depict an exemplary encryption of a gray scale image.
Figure 16B:
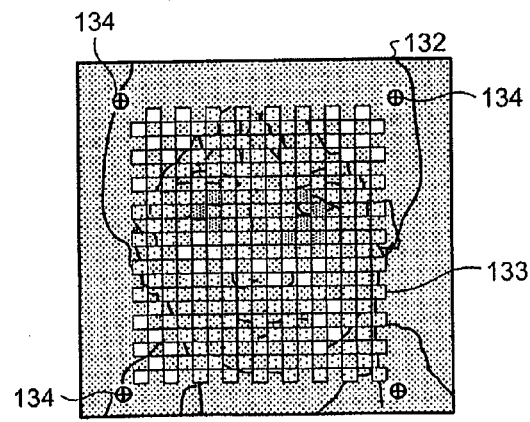

As exemplified in FIG. 16A, from a gray scale image 131, an encrypted image 132 is created that includes a converted image 133 and a positioning marker 134 as shown in FIG. 16B by the processing of the encrypting apparatus 11.

Referring to FIG. 17, description will be given for the configuration of the decrypting apparatus 14 shown in FIG. 3. FIG. 17 is a block diagram of the configuration of the decrypting apparatus according to the first embodiment. As shown in FIG. 17, the decrypting apparatus 14 includes a marker detecting unit 141, an encrypted area detecting unit 142, an encrypted position detecting unit 143, a state determining unit 171, and an image reversely converting unit 144. Description will be given below for the processes respectively of these components.

The marker detecting unit 141 detects from the encrypted image the positions of the positioning markers added by the above marker adding unit 34, using an ordinary image recognition technique. Pattern matching, analysis concerning the connectivity of figures, frequency analysis, etc., are applicable as the detecting method.

The encrypted area detecting unit 142 detects the encrypted area of the image based on the positional relation among the three positioning markers detected by the marker detecting unit 141. More specifically, when the encrypted area detecting unit 142 detects at least three positioning markers 152 from the encrypted image 151 as shown in FIG. 18, one encrypted area 153 can be detected as shown in (B) of FIG. 18.

That is, the three positioning markers 152 are disposed in the four corners of the rectangular encrypted area 153 and, therefore, the figure formed by connecting these three points (the positions of the positioning markers 152) with lines is substantially a right-angled triangle. When three or more positioning markers 152 are detected, the positional relation of the three positioning markers 152 includes an area configured into a shape that is substantially a right-angled triangle and, therefore, a rectangle having the positions of the three positioning markers 152 as the positions of its three corners of its four corners is determined to be the encrypted area 153. When the number of the positioning markers 152 detected is two or fewer, any corresponding encrypted area 153 can not be specified and, therefore, the encoding process comes to an end with the result that no encrypted area is present.

Figure 19:
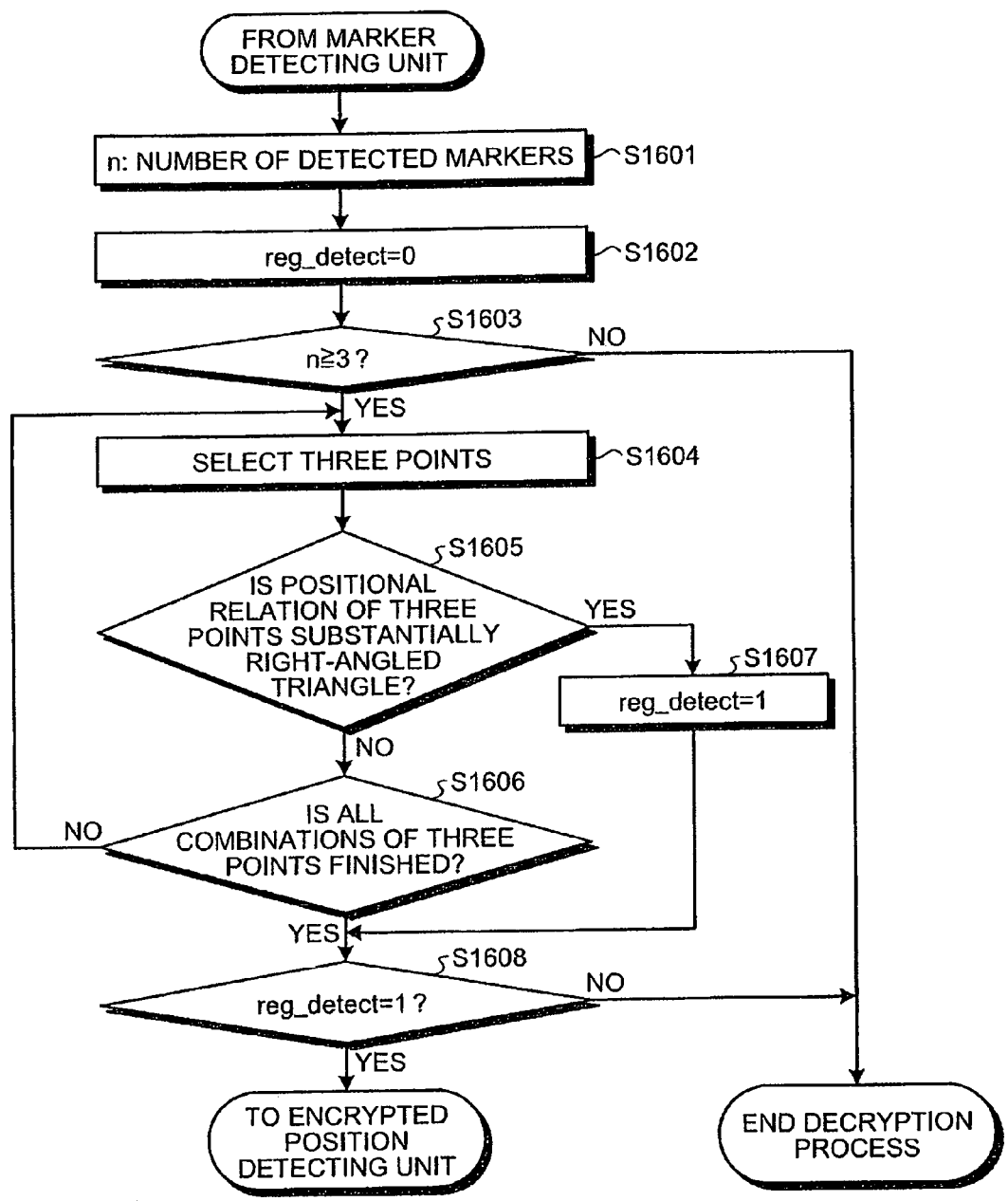
FIG. 19 is a flowchart of the flow of an encrypted area detecting process.

Referring to FIG. 19, description will be given for the flow of the encrypted area detecting process. In the encrypted area detecting process performed by the encrypted area detecting unit 142, the number of the positioning markers 152 detected by the marker detecting unit 141 is substituted by a variable "n" at step S1601, and a detection flag "reg_detect" of the encrypted area 153 is substituted by zero at step S1602.

At step S1603, whether the variable n substituted by the number of the positioning markers 152 is three or more is judged. When the variable n is not three or more, that is, when the variable n is two or less (step S1603, negative), the encrypting process including the encrypted area detecting process comes to an end.

On the other hand, when the variable n is three or more (step S1603, positive), three positioning markers 152 of the positioning markers 152 detected by the marker detecting unit 141 are selected at step S1604. Whether the positional relation formed by the selected three positioning markers 152 is a right-angled triangle is judged at step S1605.

When the positional relation of the selected three positioning markers 152 is not substantially a right-angled triangle (step S1605, negative), whether all of the combinations of the three points of the positioning markers 152 detected by the marker detecting unit 141 are completed is judged at step S1606. When the combination are not completed (step S1606, negative), the flow returns to step S1604 and other three points are selected. When the combinations are completed (step S1606, positive), the flow advances to step S1608.

On the other hand, when the positional relation of the selected three positioning markers 152 is substantially a right-angled triangle (Yes at step S1605), one is substituted for the detection flag reg_detect at step S1607. Whether one is substituted for the detection flag reg_detect, that is, whether the three positioning markers 152 that form the positional relation of the three points as a right-angled triangle can be detected is judged at step S1608. When one is substituted for reg_detect (Yes at step S1608), the flow advances to the process by the encrypted position detecting unit 143. When one is not substituted for reg_detect (No at step S1608), the decryption process that includes the encrypted area detecting process comes to an end.

Returning to the description of FIG. 17, to correctly perform the decryption by the encrypted image 151, the encrypted position detecting unit 143 detects detailed positions of each pixel in the encrypted area 153 by frequency analysis, pattern matching, etc., utilizing the fact that the end portion of the encrypted area 153 detected by the encrypted area detecting unit 142 forms a regular pixel distribution. This detection utilizes the nature of the encrypted image 151 that the entire encrypted image 151 forms a regular pattern due to the pixel value converting (inverting) process of the pixel value converting unit 33.

One detecting method can be considered of obtaining the period (width) of the pattern in terms of each of the lateral direction and the longitudinal direction of the image using a frequency analyzing method such as fast Fourier transform (FFT) and, thereafter, detecting the bound positions (offset) using template matching, etc. The bound portions can be detected by Hough transform, utilizing the nature that the bound portions of an encrypted image are straight lines when the image is applied with an edge detecting filter (such as a Laplacian filter).

Figure 20:
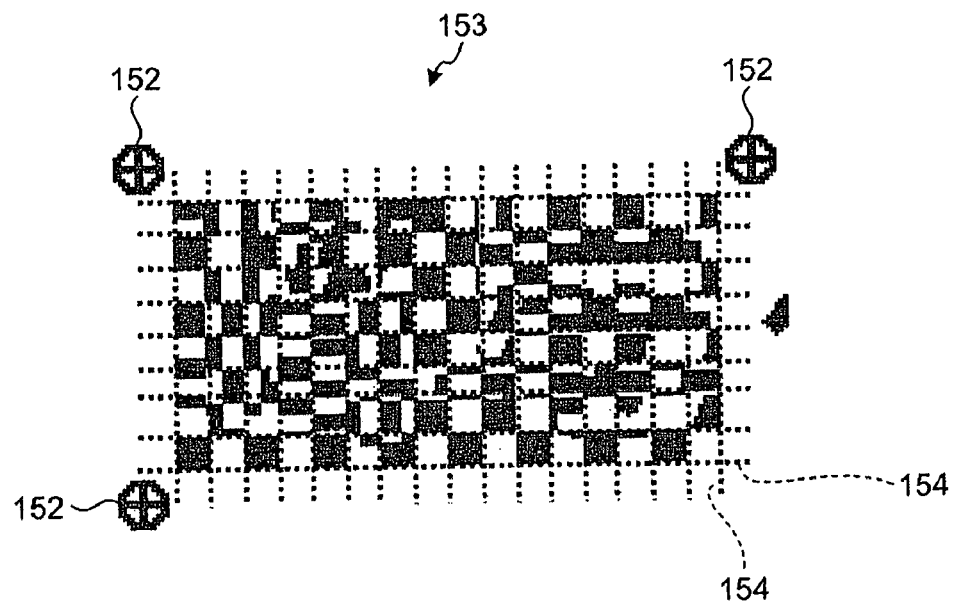
FIG. 20 depicts an example where an encrypted position is detected.

FIG. 20 depicts an example where an encrypted position is detected. When the encrypted digital image 41 is complicated, a portion for which the periodicity of the encrypted image 44 is significantly destroyed may appear. In such a case, a method is effective of performing the encrypted position detection limiting the image area to be used for the calculation of the pattern period and the bound positions to the portion that has relatively strong periodicity.

The state determining unit 171 detects the state of the encrypted image and the state determining unit 171 determines whether the encrypted image is an image passed through only the digital medium or an image passed through the analog medium, according to the state of the encrypted image. More specifically, the state determining unit 171 detects the state of the encrypted image from "the degree of degradation of the positioning markers", "the positional relation of the four corners of the encrypted area", and "the periodicity of the micro areas (width)" that are added to the encrypted area of the encrypted image. Thereby, the state determining unit 171 determines whether the encrypted image is an image passed through only the digital medium or an image passed through the analog medium and the state determining unit 171 notifies the image reversely converting unit 144 described later of the determination result.

Description will be given for the case where the state of the encrypted image is detected from the degree of degradation of the positioning markers that is added to the encrypted area of the encrypted image. That is, when the encrypted image is the image passed through the analog medium, the edges and the color of the positioning markers added to the three positions of the four corners of the encrypted area are degraded by the printing, etc., and, when pattern matching is performed to the three markers, the difference between those markers and the original digital markers becomes large. On the other hand, in the case where the encrypted image is the image passed through only the digital medium, when the pattern matching is performed to the three markers, the difference between those markers and the original three markers is zero. Determination utilizing this difference can be performed. When image compression such as joint photographic experts group (JPEG) is applied to the encrypted image, the difference is not zero. However, this difference is much smaller compared to the difference of the image degraded by the printing, etc. Therefore, the determination is possible using a threshold value process, etc.

Description will be given for the case where the state of the encrypted image is detected from the positional relation of the four corners of the encrypted area. That is, the state determining unit 171 detects the encrypted area and, when positions of the four corners of the encrypted area are inclined or deformed, the state determining unit 171 determines the encrypted image to be the image passed through the analog medium and, when the positions of the four corners are not inclined nor deformed, the state determining unit 171 determines the encrypted image to be the image passed through only the digital medium.

Description will be given for the case where the state of the encrypted image is detected from the periodicity (width) of the micro areas. That is, the state determining unit 171, utilizing the result of the encrypted position detecting unit 143, determines the encrypted image to be the image passed through only the digital medium when the periodicity (width) of the micro areas is constant and the state determining unit 171 determines the encrypted image to be the image passed through the analog medium when the periodicity has dispersion because the possibility of deformation caused by the printing and scanning is high.

Returning to the description of FIG. 17, when the encrypted image is determined to be the image passed through only the digital medium, the image reversely converting unit 144 selects the digital decryption process and, when the encrypted image is determined to be the image passed through the analog medium, the image reversely converting unit 144 selects the analog decryption process.

More specifically, the image reversely converting unit 144 receives the determination result from the state determining unit 171. When the image reversely converting unit 144 decrypts the image passed through only the digital medium, the image reversely converting unit 144 performs a reversely converting process of the converting process by the image converting unit 32 in a method corresponding to a decryption key to the encrypted image 44, using the encrypted position information detected by the encrypted position detecting unit 143 and the decryption key input by a user and, thereby, the image reversely converting unit 144 creates a decrypted image. The process procedure of the decryption is realized following a reverse procedure of the encrypting process and, therefore, description is not repeated.

Figure 21:
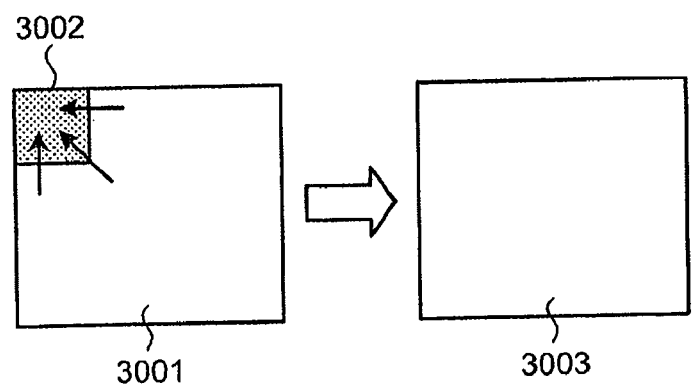
FIG. 21 is a diagram of recovery of a pixel value by an interpolating process.

On the other hand, when the image reversely converting unit 144 decrypts the encrypted image passed through the analog medium, the image reversely converting unit 144 performs filtering such as sharpness and noise removal and, thereby, improves the degradation due to the smears of ink and optical deformation. In the case where the image reversely converting unit 144 recovers pixels for which the pixel values are converted for detecting the encrypted position, when the encrypted image is determined to be a digital image and the pixel value conversion is reversible conversion such as the inverting process, the image reversely converting unit 144 performs the reverse conversion. When the encrypted image is determined to be an analog image or when the pixel value conversion is irreversible conversion, the image reversely converting unit 144 may recover the pixel values by linear interpolation from the neighboring pixels as exemplified in FIG. 21.

That is, for the encrypted image passed through the analog medium, the digital image is printed and is read by the optical apparatus such as a camera and a scanner. Therefore, the contour is smeared due to smear of ink and optical deformation. Therefore, the image reversely converting unit 144 needs to select a process of improving the degradation of the image quality or a process of recovering the pixel values converted by the pixel value converting unit using an interpolating process. On the other hand, the encrypted image passed through only the digital medium has no degradation of its image due to smears of ink, optical deformation, etc., and, therefore, the image reversely converting unit 144 selects a process of performing the reverse processing of the encryption to decrypt the image.

Figure 22:
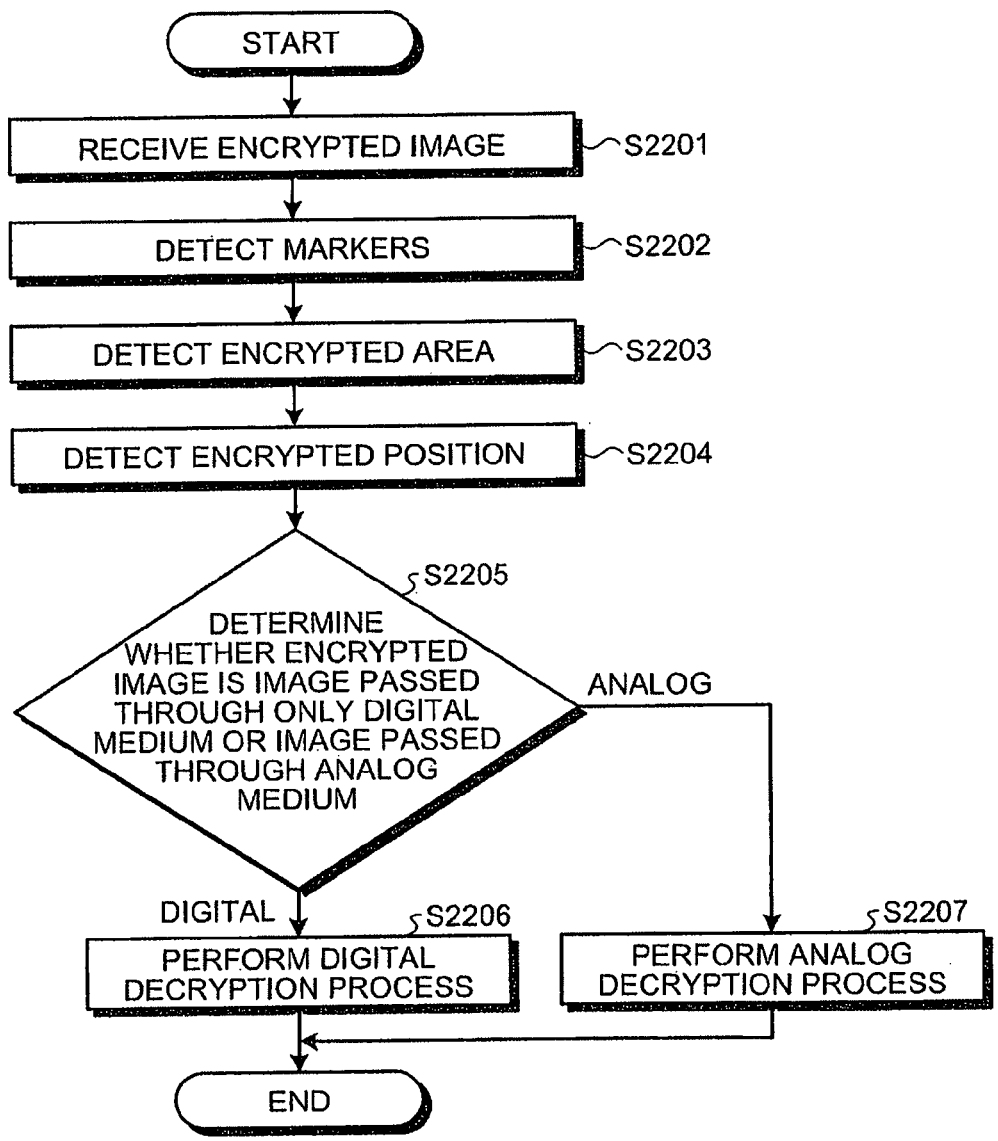
FIG. 22 is a flowchart of a process operation of the decrypting apparatus according to the first embodiment.

Referring to FIG. 22, description will be given for a process by the decrypting apparatus 14 according to the first embodiment. FIG. 22 is a flowchart of a process operation of the decrypting apparatus 14 according to the first embodiment.

As shown in FIG. 22, when the marker detecting unit 141 of the decrypting apparatus 14 receives an encrypted image (step S2201), the marker detecting unit 141 detects the positions of the position markers from the encrypted image using an ordinary image recognition technique (step S2202). The encrypted area detecting unit 142 detects the area of the image that is encrypted based on the positional relation of the three positioning markers detected by the marker detecting unit 141 (step S2203).

To correctly perform the decryption of the encrypted image, the encrypted position detecting unit 143 detects detailed positions of each pixel in the encrypted area by frequency analysis, pattern matching, etc., utilizing the fact that the end portion of the encrypted area detected by the encrypted area detecting unit 142 forms a regular pixel distribution (step S2204).

The state determining unit 171 detects the state of the encrypted image and the state determining unit 171 determines whether the encrypted image is an image passed through only the digital medium or an image passed through the analog medium, according to the state of the encrypted image (step S2205). As a result, the image reversely converting unit 144 selects the digital decryption process when the encrypted image is determined to be an image passed through only the digital medium (step S2206), and the image reversely converting unit 144 selects the analog decryption process when the encrypted image is determined to be an image passed through the analog medium (step S2207).

As above, for an encrypted image that passes through the analog medium, a digital image is printed and an optical apparatus such as a camera or a scanner reads the printed image and, therefore, the contour of the encrypted image is smeared due to smears of ink and optical deformation. Therefore, the encrypting apparatus 11 needs to select the process of improving the degradation of the image quality, and the process of recovering, using the interpolating process, each pixel value whose value is varied by the pixel value converting unit. On the other hand, for an encrypted image that passes through only a digital medium, because the image has no degradation due to the smears of ink and the optical deformation, the encrypting apparatus 11 selects the process of decryption the image by performing the reverse process of the encryption. In this manner, the encrypting apparatus 11 enables improvement of the image quality of the decrypted image by selecting its decryption process depending on whether the encrypted image passes through only a digital medium or an analog medium.

According to the first embodiment, the degree of degradation of predetermined markers added to the encrypted area of the encrypted image is detected as the state of the encrypted image. According to the degree of degradation of the predetermined markers, whether the encrypted image is an image passed only the digital medium or an image passed through the analog medium is determined. That is, when the encrypted image is the image passed through the analog medium, the edge and the color of the positioning markers added to the three positions of the four corners of the encrypted area are degraded. Therefore, when the three markers are applied with pattern matching, the difference between those markers and the original digital markers is large. On the other hand, in the case where the encrypted image is the image passed through only the digital medium, when the pattern matching is performed to the three markers, the difference between those markers and the original three markers is zero. Utilizing these differences, the first embodiment enables correct determination of whether the encrypted image is the image passed through only the digital medium or the image passed through the analog medium.

According to the first embodiment, the positional relation of the four corners of the encrypted area is detected as the state of the encrypted image, and whether the encrypted image is the image passed through only the digital medium or the image passed through the analog medium is determined according to the positional relation of the four corners of the encrypted area. That is, when positions of the four corners of the encrypted area are inclined or deformed, the encrypted image is determined to be the image passed through the analog medium and, when the positions of the four corners are not inclined nor deformed, the encrypted image is determined to be the image passed through only the digital medium. In this manner, the first embodiment enables correct determination of whether the encrypted image is the image passed through only the digital medium or the image passed through the analog medium, utilizing the positional relation of the four corners of the encrypted area.

According to the first embodiment, the periodicity of the rearranged micro areas is detected as the state of the encrypted image, and whether the encrypted image is the image passed through only the digital medium or the image passed through the analog medium is determined according to the periodicity of the micro areas. That is, when the periodicity (width) of the micro areas is constant, the encrypted image is determined to be the image passed through only the digital medium. On the other hand, when the periodicity has dispersion, the encrypted image is determined to be the image passed through the analog medium because the possibility of deformation caused by the printing and scanning is high. In this manner, the first embodiment enables correct determination of whether the encrypted image is the image passed through only the digital medium or the image passed through the analog medium, utilizing the periodicity of the micro areas.

According to the first embodiment, when the encrypted image is determined to be the image passed through only the digital medium, selecting is performed such that the reverse computing process of the encryption is performed as the digital decryption process. On the other hand, when the encrypted image is determined to be the image passed through the analog medium, selecting is performed such that the interpolating process of the pixel values is performed as the analog decryption process. Therefore, the first embodiment exerts an effect that the image quality of the decrypted image is improved according to whether the encrypted image is the image passed through only the digital medium or the image passed through the analog medium.

In the above first embodiment, description has been given for the case where the state of the encrypted image is detected from "the degree of degradation of the positioning markers", "the positional relation of the four corners of the encrypted area", and "the periodicity (width) of the micro areas" that are added to the encrypted area of the encrypted image. Thereby, whether the encrypted image is an image passed through only the digital medium or an image passed through the analog medium is determined. However, the present invention is not limited to this, and a flag for determining whether the encrypted image is digital or analog may be added to the encrypted image and, thereby, whether the encrypted image is an image passed through only the digital medium or an image passed through the analog medium may be determined.

Figure 23:
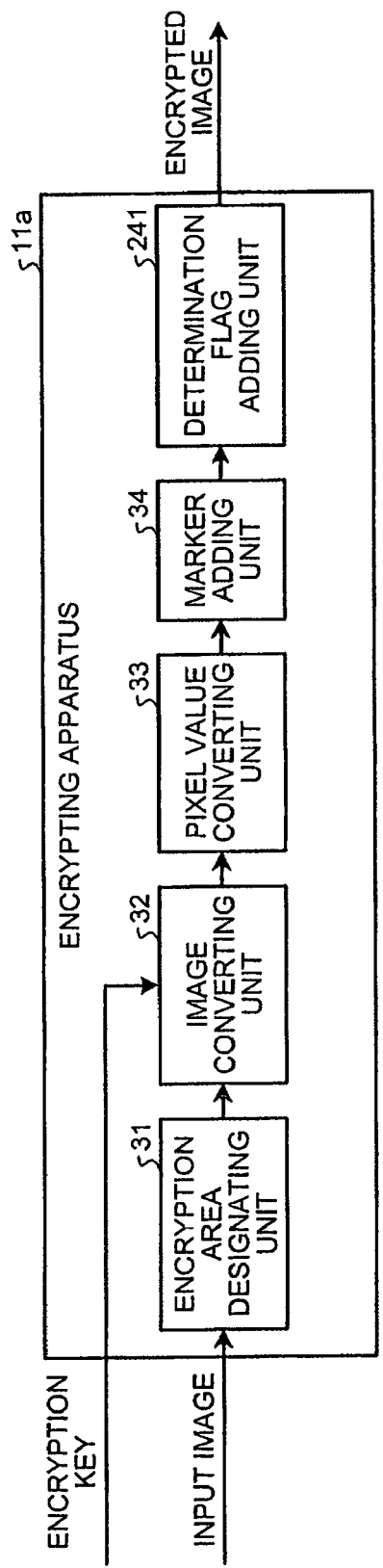
FIG. 23 is a block diagram of the configuration of an encrypting apparatus according to a second embodiment.
Figure 24:
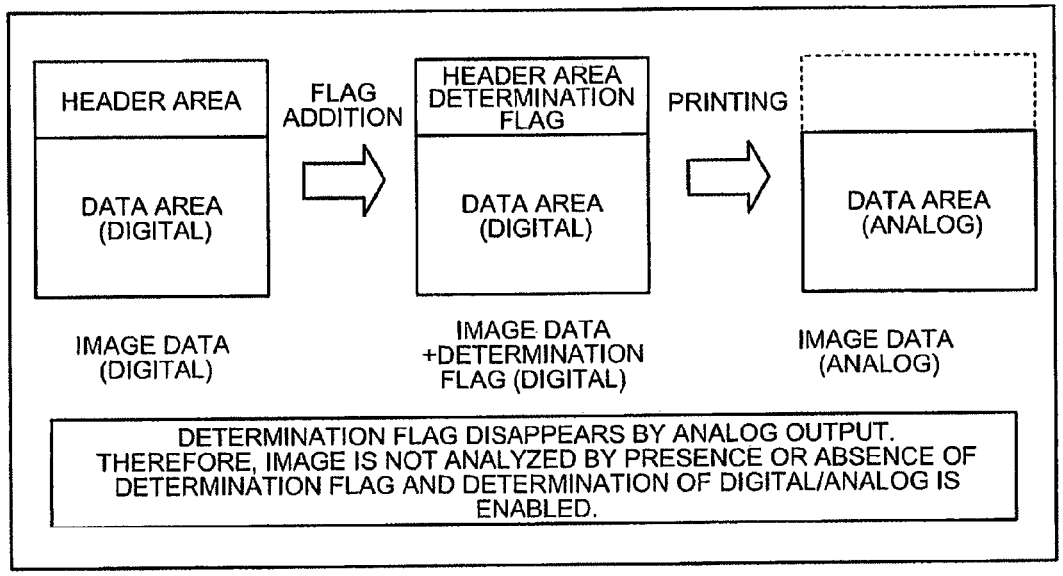
FIG. 24 is a diagram of the mechanism of addition of a digital/analog determination flag.
Figure 25:
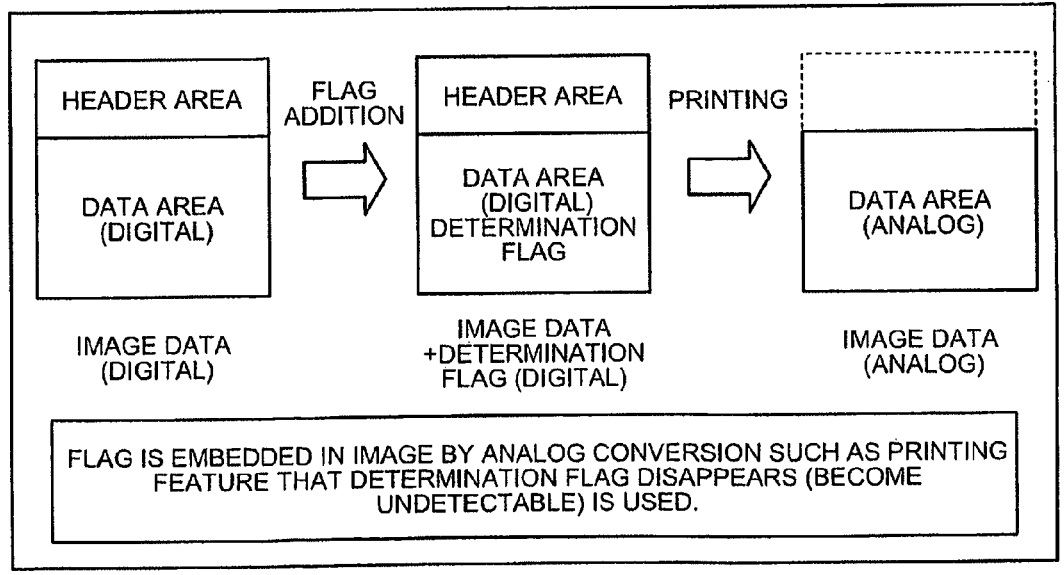
FIG. 25 is a diagram of the mechanism of addition of the digital/analog determination flag utilizing a digital watermark.

In a second embodiment below, description will be given for an encrypting apparatus 11a and a decrypting apparatus 14a in the second embodiment referring to FIGS. 23 to 25, as the case where the digital/analog determination flag for the encrypted image is added to the encrypted image and, thereby, whether the encrypted image is an image passed through only the digital medium or an image passed through the analog medium is determined. FIG. 23 is an explanatory block diagram of the configuration of the encrypting apparatus 11a according to the second embodiment. FIG. 24 is a diagram of the mechanism of addition of a digital/analog determination flag. FIG. 25 is a diagram of the mechanism of addition of the digital/analog determination flag utilizing a digital watermark.

Description will be given for the configuration of the encrypting apparatus 11a according to the second embodiment. As shown in FIG. 23, the encrypting apparatus 11a is different compared to the encrypting apparatus 11 shown in FIG. 4 in that the encrypting apparatus 11a newly includes a determination flag adding unit 241. In the encrypting apparatus 11a, the determination flag adding unit 241 adds a digital/analog determination flag for the encrypted image to a header portion to which the format of the encrypted image is written, or to the image portion.

Different from the first embodiment, the state determining unit 171 of the decrypting apparatus 14a according to the second embodiment determines whether the encrypted image is an image passed through only the digital medium or an image passed through the analog medium, using the digital/analog determination flag added to the encrypted image.

More specifically, as exemplified in FIG. 24, whether digital or analog may be determined using a mechanism that causes the added determination flag to be undetectable when the encrypted image is output to an analog medium. As shown in FIG. 25, the determination flag may be added to the image using techniques such as an electronic signature, a digital watermark, and steganography that each does not have any resistance against analog conversion such as printing.

Not only the determination flag as the information to be added but also information necessary for decrypting such as coordinate information to identify the position of the encrypted image are added and, thereby, decryption can be performed by reading the coordinate information of the encrypted area that is added to the header portion for the decryption of the encrypted image that passes through only the digital medium. As a result, processes such as marker detection, encrypted area detection, encryption position detection that each need much computing can be avoided or simplified.

As above, according to the second embodiment, in the encrypted image added with the determination flag that disappears when the image passes through an analog medium, the determination flag is detected from the encrypted image. As a result, when the determination flag is detected, the encrypted image is determined to be the image passed through only the digital medium and, when no determination flag is detected, the encrypted image is determined to be the image passed through the analog medium. That is, the second embodiment enables simple determination of whether the encrypted image is the image passed through only the digital medium or the image passed through the analog medium, utilizing the determination flag.

In the present invention, before the encrypting conversion of an image, a dummy signal may be added to the image. In a third embodiment below, description will be given for the configuration and the process of each of an encrypting apparatus 11b and a decrypting apparatus 14b in the third embodiment as the case where a dummy signal is added to the image, referring to FIGS. 26 to 38.

Figure 26:
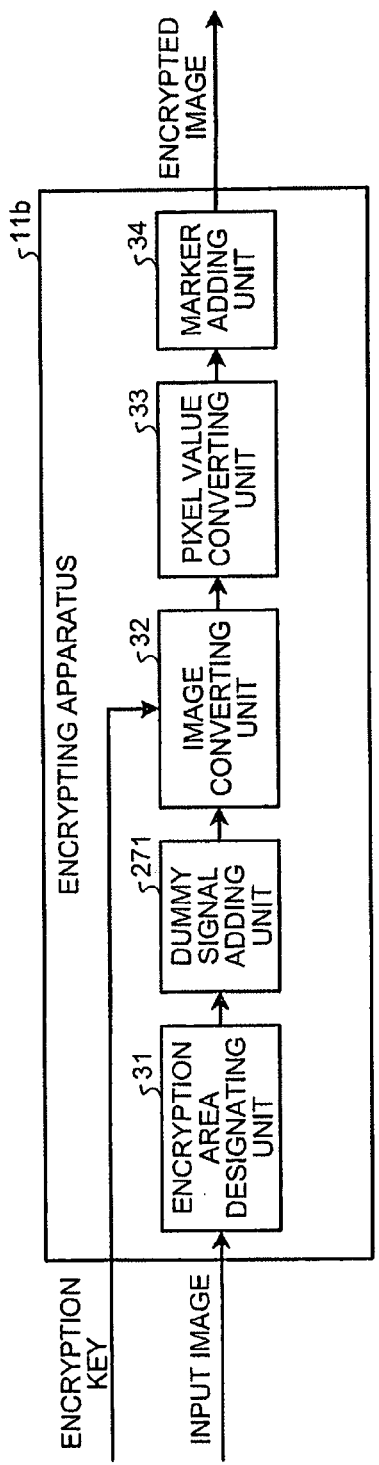
FIG. 26 depicts the overview of a process of adding a dummy signal of an encrypting apparatus according to a third embodiment.
Figure 27:
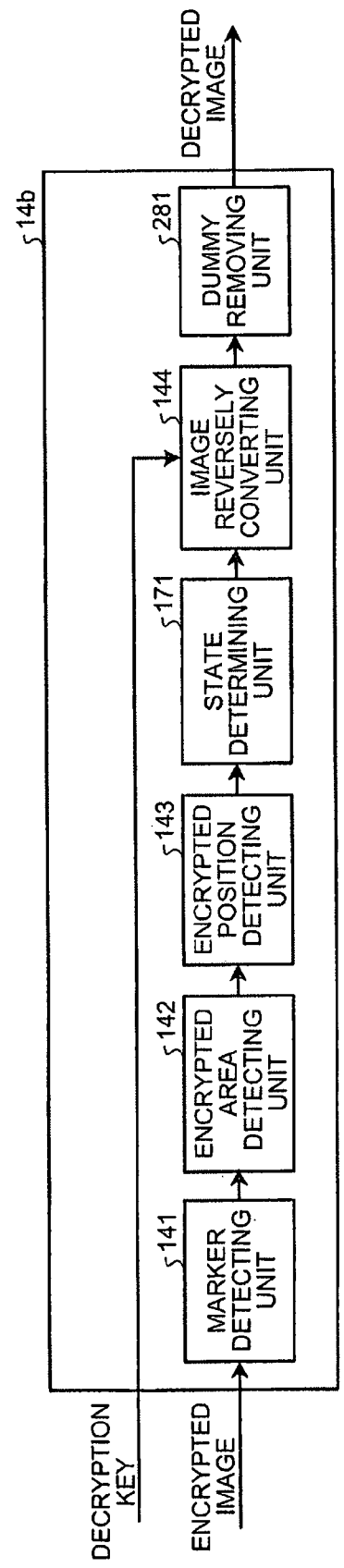
FIG. 27 depicts the overview of a process of removing the dummy signal of a decrypting apparatus according to the third embodiment.
Figure 28A:
FIGS. 28A to 28C depict exemplary dummy signals.
Figure 28B:
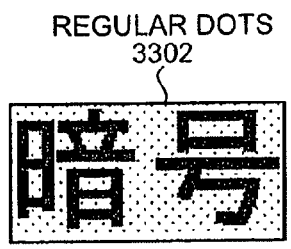
Figure 28C:
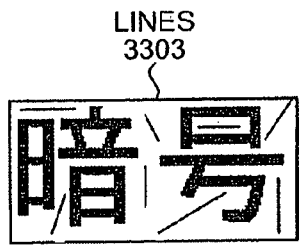
Figure 29A:
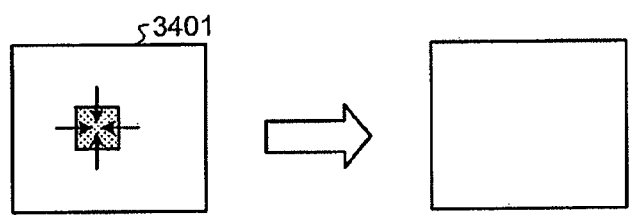
FIGS. 29A and 29B are diagrams of removal of the dummy signal.
Figure 29B:
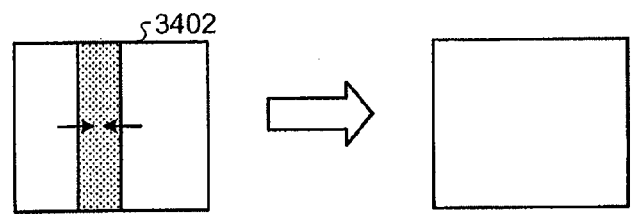
Figure 30A:
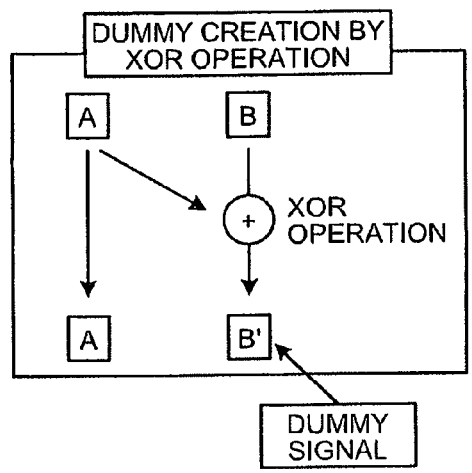
FIGS. 30A and 30B are diagrams of the mechanisms respectively of creation and removal of the dummy signal using an exclusive logical sum.
Figure 30B:
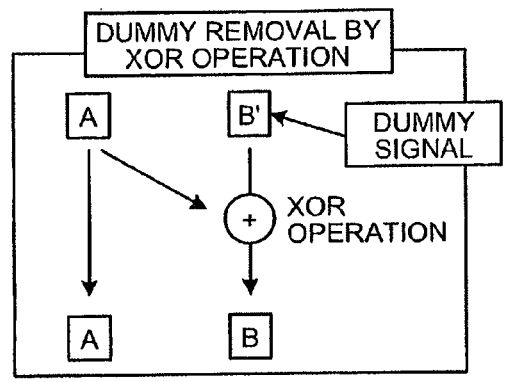
Figure 31:
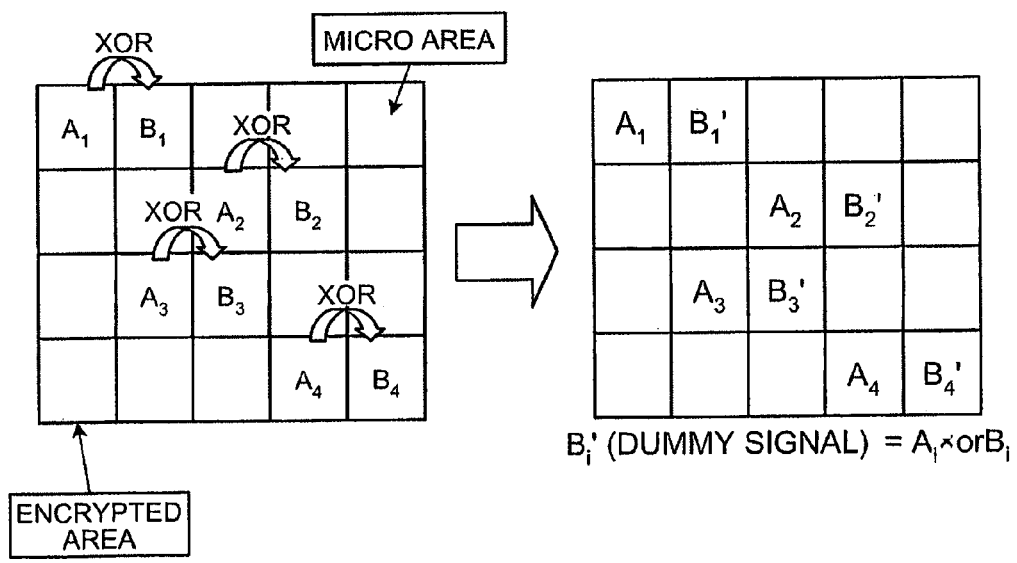
FIG. 31 is a diagram of a dummy adding method using an exclusive logical sum of micro areas.
Figure 32:
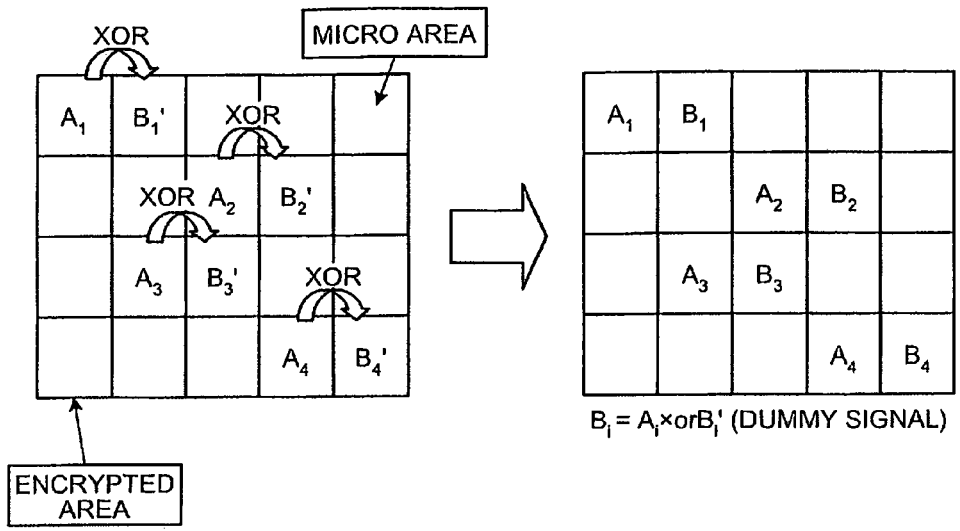
FIG. 32 is a diagram of a dummy removing method using an exclusive logical sum of micro areas.
Figure 33:
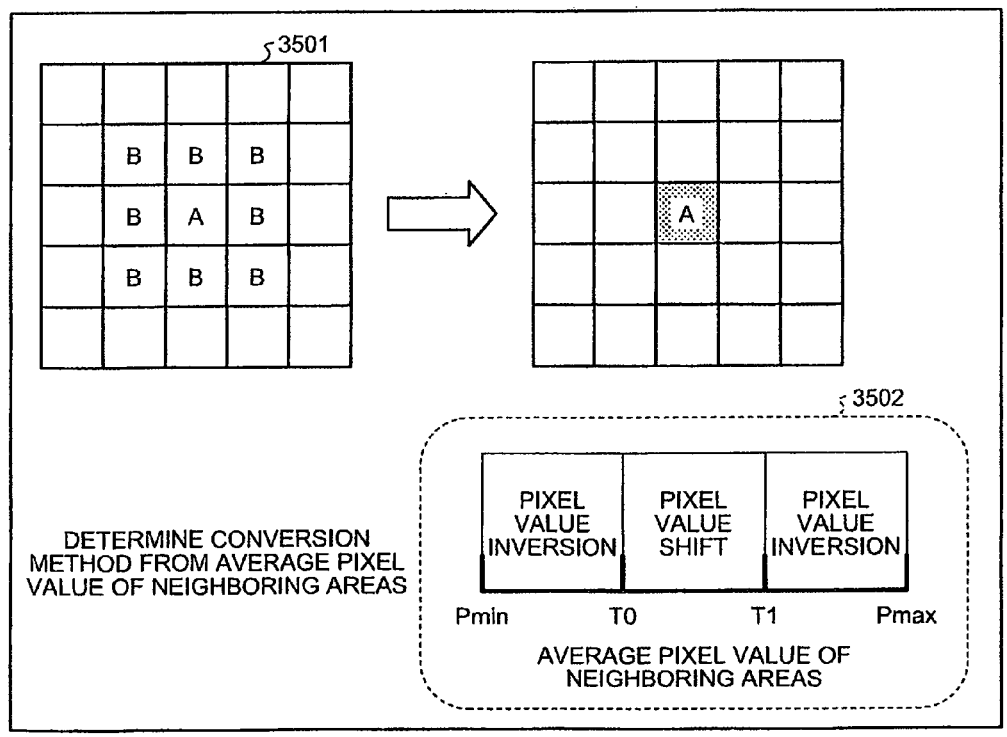
FIG. 33 is a diagram of a dummy adding method using the statistical nature of neighboring pixels.
Figure 34:
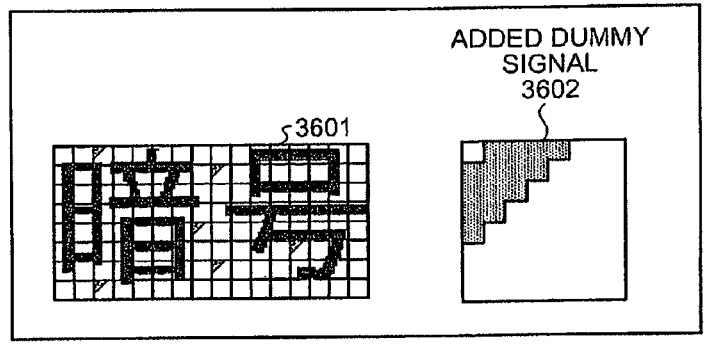
FIG. 34 depicts an example of a dummy signal by a pattern.
Figure 35:
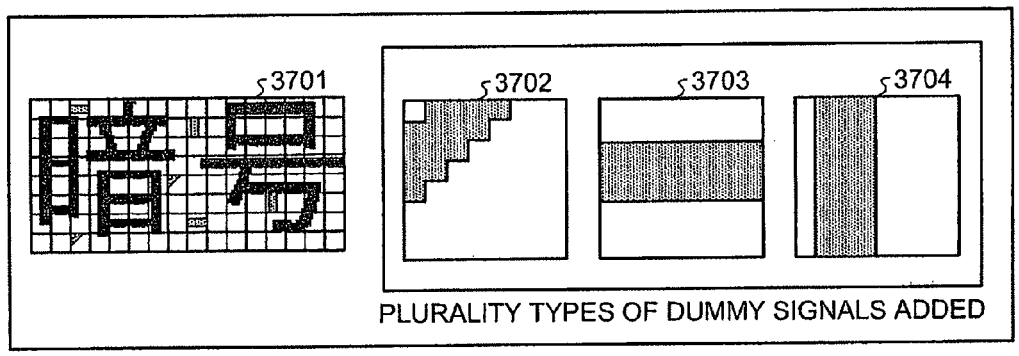
FIG. 35 depicts an adding method of a dummy signal by a plurality of patters.
Figure 36:
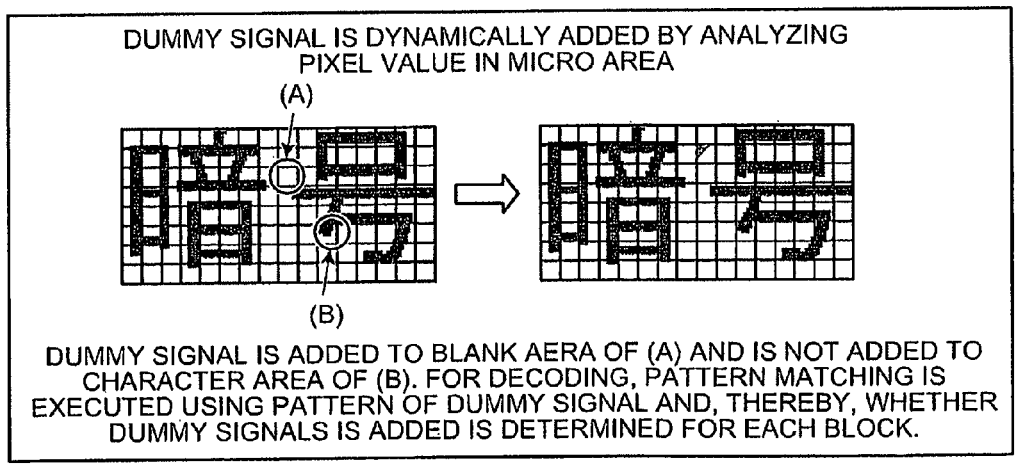
FIG. 36 is a diagram of a method of dynamically adding a dummy signal.
Figure 37:
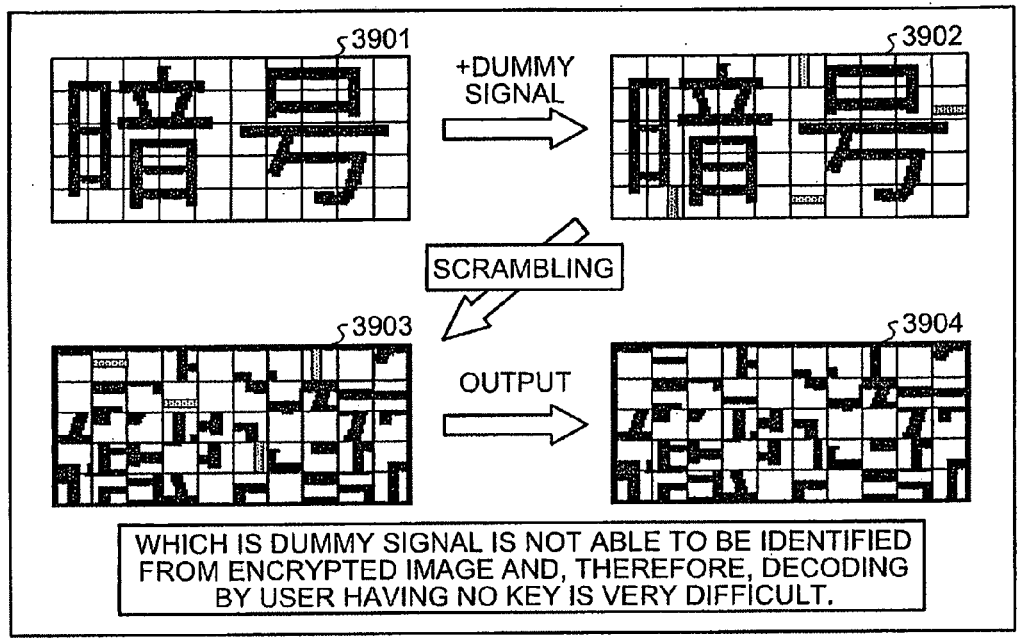
FIG. 37 is a diagram of an effect of the dummy signal.
Figure 38:
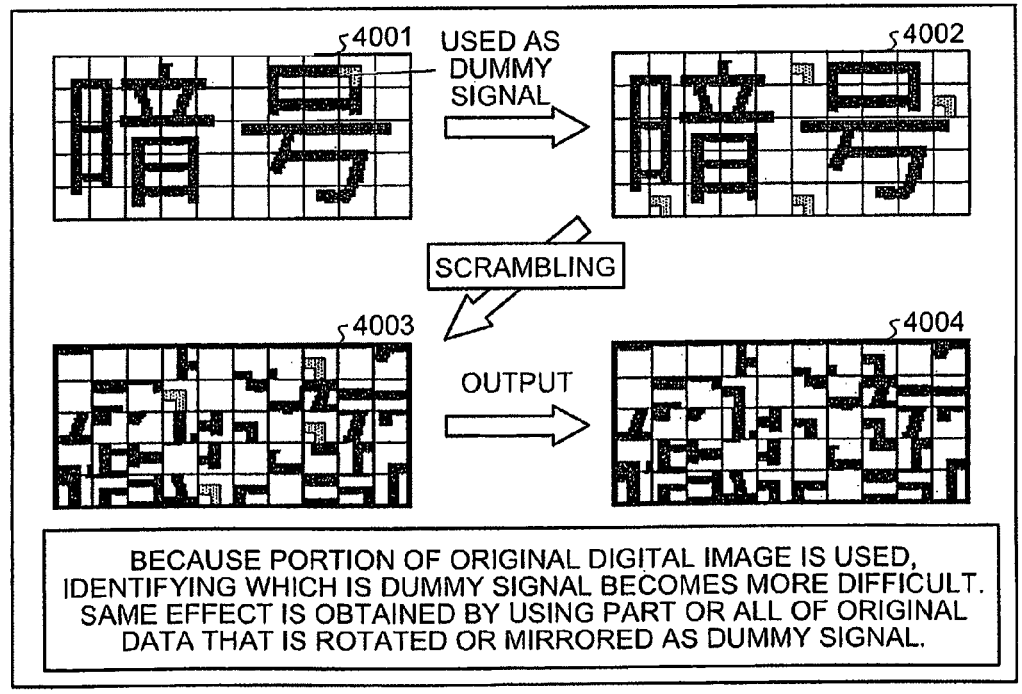
FIG. 38 depicts an example where a portion of the original digital image is used as the dummy signal.

FIG. 26 depicts the overview of the process of adding a dummy signal of the encrypting apparatus according to the third embodiment. FIG. 27 depicts the overview of the process of removing the dummy signal of the decrypting apparatus according to the third embodiment. FIGS. 28A to 28C depict exemplary dummy signals. FIGS. 29A and 29B are diagrams of removal of the dummy signal. FIG. 33 is a diagram of a dummy adding method using the statistical nature of neighboring pixels. FIG. 34 depicts an example of a dummy signal by a pattern. FIG. 35 depicts an adding method of a dummy signal by a plurality of patters. FIG. 36 is a diagram of a method of dynamically adding a dummy signal. FIGS. 30A and 30B are diagrams of the mechanisms respectively of creation and removal of the dummy signal using an exclusive logical sum. FIG. 31 is a diagram of a dummy adding method using an exclusive logical sum of micro areas. FIG. 32 is a diagram of a dummy removing method using an exclusive logical sum of micro areas. FIG. 37 is a diagram of an effect of the dummy signal. FIG. 38 depicts an example where a portion of the original digital image is used as the dummy signal.

As shown in FIG. 26, the encrypting apparatus 11b is different compared to the encrypting apparatus 11 shown in FIG. 4 in that the encrypting apparatus 11b newly includes a dummy signal adding unit 271. In the encrypting apparatus 11b, the dummy signal adding unit 271 adds a dummy signal to an image.

As shown in FIG. 27, the decrypting apparatus 14b is different compared to the decrypting apparatus 14 shown in FIG. 17 in that the decrypting apparatus 14b newly includes a dummy removing unit 281. In the decrypting apparatus 14b, the dummy removing unit 281 removes a dummy signal.

That is, when an image is divided into micro areas and is scrambled. The image may be decrypted in an unauthorized way by trial and error without any decryption key based on information such as correlations among the micro areas using connections among edges, and color tones. Therefore, the correlations among the micro areas are lost by adding a dummy signal and, thereby the decryption without the decryption key is made difficult.

For a "dummy signal" used herein, dots as a dummy added image 3301 of FIG. 28A may randomly be added, a regular dot pattern as an image 3302 of FIG. 28B may be added, and lines as an image 3303 of FIG. 28C may be added. When the dummy signal is added as the dots or the lines, the dots and lines can be removed after the decryption using a noise removing filter such as a low pass filter or a median, or using an interpolating process using the pixel values of the neighboring pixels as shown in FIGS. 29A and 29B.

A method of adding a dummy signal can be, in addition to overwriting with an arbitrary value: a method of adding a dummy signal by a reversible pixel value conversion such as inversion or a shift operation of the pixel value, and an exclusive logical sum; and a method of adding a dummy signal by an operation using the statistical nature of the neighboring pixels of the pixel to be added with the dummy signal. Denoting the maximal pixel value as "$P_{max}$", the minimal pixel value as "$P_{min}$", the pixel value before conversion as "x", and the pixel value after the conversion as "y", the operation equation for inversion is expressed as $$y=P_{max}-x+P_{min}.$$

The operation equation of the shift operation is expressed as $$Y=(x+P_{max}-P_{min}+1)/2 \bmod P_{max})+P_{min}.$$

Referring to FIGS. 30 to 32, description will be given for an example where an operation result is added as a dummy signal. More specifically, an example will be described where exclusive disjunction (XOR) is obtained with the adjacent micro areas and the result of this operation is added as a dummy signal. As shown in FIGS. 30A and 30B, the XOR is a reversible conversion and, therefore, the XOR with the pixel values respectively of the neighboring micro areas is added as a dummy signal as in FIG. 31. When the dummy signal is decrypted, as shown in FIG. 32, the added dummy signal is removed by obtaining again the XOR. In this case, the operation for each micro area is shown as an example. However, an exclusive disjunction for adjacent pixels in a micro area or for an encrypted area may surely be obtained.

FIG. 33 depicts dummy adding method by an operation using the statistical nature of the neighboring pixels. As shown in FIG. 33, a pixel "A" is the pixel to be added with a dummy signal. The dummy signal switches the operation method depending on the average pixel value of a neighboring area B of the pixel A. When the average pixel value has a value that is smaller than T0 or larger than T1 as in reference numeral 3502 of FIG. 33, an inversion process is performed. When the average pixel value has a value that is between T0 and T1, a shift operation is performed.

In the case where a dummy signal is added, in the case where the dummy signal is added by reversible conversion such as inversion or a shift operation of the pixel value, when the image is decrypted, dummy signal removal without any information loss can be performed by performing a reverse operation of that performed for adding the dummy signal. When it is clear that the dummy signal is added to a blank area, a dummy signal may be fully colored with the background color.

When an input image is in a format that includes a plurality of components such as RGB, YUV, and CMYK, only one component may be converted or two or more components may be converted, or a dummy signal may be added after converting the input image of RGB into that of another format such as YUV.

A dummy signal can be added for each micro area. For example, as shown at reference numeral 3601 of FIG. 34, a specific pattern 3602 may be added as a dummy signal. As shown at reference numeral 3701 of FIG. 35, a plurality of patterns as shown at reference numerals 3702 to 3704 may be added. As to a micro area to be added with a pattern, the pattern may be added to a micro area that can be uniquely obtained from the encryption key or the pattern may be added periodically at constant intervals.

A dummy signal may be added to an arbitrary position. However, as shown in FIG. 36, when the dummy signal is added to only a blank area (A) avoiding a character area (B), the case where the character and the dummy signal overlap each other needs not to be considered for decrypting the image and, therefore, the dummy signal removal is facilitated.

As above, when an encrypted image to which a dummy signal is dynamically added is decrypted, it is necessary to determine whether a dummy signal is added to each micro area. However, when the dummy signal is added as a pattern as above, by performing pattern matching before dummy signal removal, only the dummy signal in the micro area can be extracted and removed. In the above, description has been given for the case where a dummy signal is added to an image before its scrambling, the same effect is obtained in the case where the dummy signal is added to the image after its scrambling.

Because a dummy signal is added as above, unauthorized decryption by a user having no key is difficult as shown in FIG. 37 and, therefore, encryption strength is high compared to the case where no dummy signal is added. Though the dummy signal is set as a pattern, a portion of the original digital image or an image formed by converting a portion of the original digital image by rotation or mirroring may be used as a dummy signal as shown in FIG. 38.

As above, the third embodiment adds a dummy signal to the digital image and, therefore, enables the decryption without any key to be more difficult.

As above, description has been given for the embodiments of the present invention referring to the accompanying drawings. However, the processing apparatus that performs the encrypting process and the decryption process that are applied with the present invention is not limited to the above as far as its functions are performed. A single apparatus, a system or a consolidated apparatus including a plurality of apparatuses, and a system for which processes are performed through a network such as a LAN or a WAN are all usable. Description will be given for another embodiment that is included in the present invention as a fourth embodiment.

Figure 39:
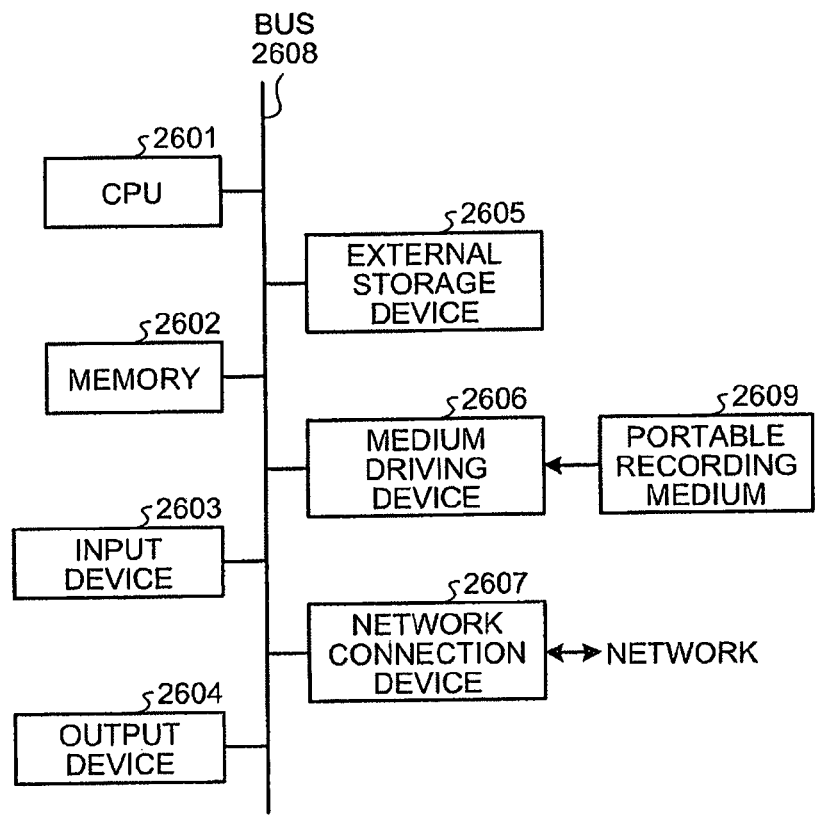
FIG. 39 depicts the configuration of a processing apparatus that performs the encrypting process and the decryption process of the present invention.

As shown in FIG. 39, the processing apparatus can also be realized by a system that includes a central processing unit (CPU) 2601 connected to a bus 2608, a memory 2602 that is a read only memory (ROM) or a random access memory (RAM), an input device 2603, an output device 2604, an external storage device 2605, a medium driving device 2606, a portable recording medium 2609, and a network connection device 2607. That is, the processing apparatus may be surely achieved by supplying to the processing apparatus the memory 2602 that is the ROM or the RAM, the external storage device 2605, and the portable recording medium 2609 that each have recorded thereon a program code of software that realizes the system of the above embodiments, and by reading and performing the program code by a computer of the processing apparatus.

In this case, the program code itself read from the portable recording medium 2609, etc., realizes the novel function of the present invention and the portable recording medium 2609, etc., that each has the program code recorded thereon each constitutes the present invention.

For example, a flexible disc, a hard disk, an optical disc, a magneto-optical disc, a compact disk-read only memory (CD-ROM), a compact disk recordable (CD-R), a digital versatile disk-read only memory (DVD-ROM), a DVD-RAM, a magnetic tape, a non-volatile memory card, a ROM card, and various recording media that each have recorded thereon the program code through the network connection device 2607 such as an electronic mail or personal computer communication (that is, a communication line) may each be used as the portable recording medium 2609 to supply the program code.

Figure 40:
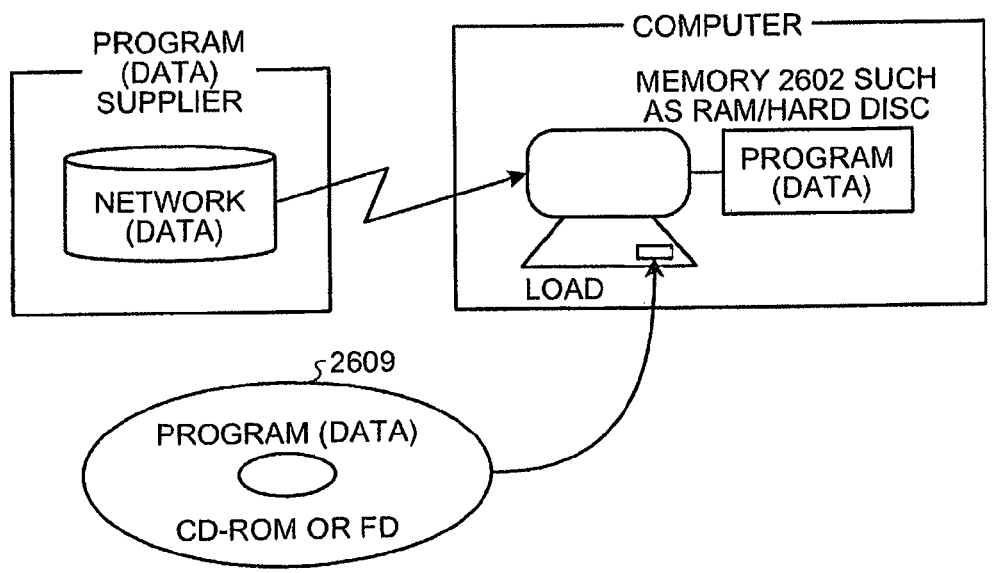
FIG. 40 illustrates loading of an encrypting and decrypting program of the present invention to a computer.

As shown in FIG. 40, by performing the program code expanded by the computer onto the memory 2602, the functions of the above embodiments are realized and, based on instructions of the program code, an operating system (OS), etc., operating on the computer performs a part or all of the actual processes. Therefore, these actual processes also realize the function of the above embodiments.

After the program code read from the portable recording medium 2609 or a program (data) supplied from a program (data) supplier is written into the memory 2602 included in a function expansion board inserted into the computer or a function expansion unit connected to the computer, the CPU 2601, etc, included in the function expansion board or the function expansion unit perform a part or all of the actual processes based on the instructions of the program code, the function of the above embodiments may also be realized by the actual functions.

For an encrypted image that passes through an analog medium, a digital image is printed and an optical device such as a camera or a scanner reads the printed image and, therefore, the contour of the encrypted image is smeared due to smears of ink and optical deformation. Therefore, the disclosed apparatus needs to switch its decryption process to the process of improving the degradation of the image quality, and the process of recovering, using the interpolating process, each pixel value whose value is varied by the pixel value converting unit. On the other hand, for an encrypted image that passes through only a digital medium, because the image has no degradation due to the smears of ink and the optical deformation, the disclosed apparatus switches its decryption process to the process of decrypting the image by performing the reverse processing of the encryption. In this manner, the disclosed apparatus exerts an effect of improving the image quality of the decrypted image by selecting the decryption process depending on whether the encrypted image passes through only a digital medium or an analog medium.

A dummy signal is added to the image to be encrypted in its partial area and the image is converted to a processed image based on an encryption key. Therefore, for an image in the encrypted area, a feature of the dummy other than a feature of the original image is able be added. Therefore, the disclosed apparatus exerts an effect that the apparatus enables the feature of the original image of the encrypted image to be further made inconspicuous using the data of the dummy.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image decrypting apparatus for decrypting an encrypted image using a decryption key, comprising:
    an encrypted image determining unit that detects a state of the encrypted image and determines whether the encrypted image is an image passed through only a digital medium or an image passed through an analog medium according to the state of the encrypted image; and
    a decryption process selecting unit that selects a digital decryption process when the encrypted image is determined to be the image passed through only the digital medium, the decryption process selecting unit selecting an analog decryption process when the encrypted image is determined to be the image passed through the analog medium.

2. The image decrypting apparatus according to claim 1, wherein
    the encrypted image determining unit detects a degree of degradation of a predetermined positioning marker added to the encrypted image in its encrypted area as a state of the encrypted image, the encrypted image determining unit determining whether the encrypted image is the image passed through only the digital medium or the image passed through the analog medium according to the degree of degradation of the predetermined marker.

3. The image decrypting apparatus according to claim 1, wherein
    the encrypted image determining unit detects a positional relation of four corners of an encrypted area as the state of the encrypted image, the encrypted image determining unit determining whether the encrypted image is the image passed through only the digital medium or the image passed through the analog medium according to the positional relation of the four corners of the encrypted area.

4. The image decrypting apparatus according to claim 1, wherein
    the encrypted image determining unit detects the periodicity of rearranged micro areas as a state of the encrypted image, the encrypted image determining unit determining whether the encrypted image is the image passed through only the digital medium or the image passed through the analog medium according to the periodicity of the micro areas.

5. The image decrypting apparatus according to claim 1, wherein
    the encrypted image determining unit, in an encrypted image added with a determination flag that disappears after passing through an analog medium, detects the determination flag from the encrypted image, the encrypted image determining unit determining the encrypted image to be an image passed through only the digital medium when the determination flag is detected, and the encrypted image determining unit determining the encrypted image to be an image passed through the analog medium when the determination flag is not detected.

6. The image decrypting apparatus according to claim 1, wherein
the decryption process selecting unit selects a reverse operation process of encryption as the digital decryption process when the encrypted image determining unit determines the encrypted image to be the image passed through only the digital medium, the decryption process selecting unit switching to perform an interpolating process of pixel values as the analog decryption process when the encrypted image determining unit determines the encrypted image to be the image passed through the analog medium.

7. An image encrypting apparatus for encrypting an image to be decrypted by the image decrypting apparatus according to claim 1, the image encrypting apparatus comprising a determination flag adding unit that adds to the encrypted image a determination flag, wherein the determination flag disappears after the image passes through an analog medium.

8. The image encrypting apparatus according to claim 7, wherein
the determination flag adding unit uses an electronic signature, a digital watermark, or steganography to add the determination flag to the encrypted image.

9. The image encrypting apparatus of claim 7, wherein the determination flag adding unit adds the determination flag to a header portion of the encrypted image.

10. The image encrypting apparatus of claim 9, wherein the determination flag adding unit adds the determination flag to the header portion of the encrypted image, the unit adding coordinate information to specify the position of the encrypted area to the header portion.

11. A method for decrypting an encrypted image using a decryption key in an image decrypting apparatus, the method comprising:
detecting a state of the encrypted image;
determining whether the encrypted image is an image passed through only a digital medium or an image passed through an analog medium according to the state of the encrypted image; and
selecting a digital decryption process when the encrypted image is determined to be the image passed through only the digital medium, and selecting an analog decryption process when the encrypted image is determined to be the image passed through the analog medium.

12. A computer program product having a non-transitory computer readable medium including programmed instructions for decrypting an encrypted image using a decryption key, wherein the instructions, when executed by a computer, cause the computer to perform:
detecting a state of the encrypted image;
determining whether the encrypted image is an image passed through only a digital medium or an image passed through an analog medium according to the state of the encrypted image; and
selecting a digital decryption process when the encrypted image is determined to be the image passed through only the digital medium, and selecting an analog decryption process when the encrypted image is determined to be the image passed through the analog medium.

13. An image encrypting apparatus for encrypting an image using an encrypting key, comprising:
an encryption area designating unit that designates a partial area to be encrypted from the image;
a dummy signal adding unit that adds a dummy signal to the image using a statistical nature of a vicinity of a pixel to be added with the dummy signal;
an image converting unit that converts the partial area designated by the encryption area designating unit into a processed image based on the encryption key; and
a pixel value converting unit that creates a converted image by regularly converting a pixel value of the processed image converted by the image converting unit to enable a position of the partial area to be designated.

14. The image encrypting apparatus according to claim 13, wherein
the dummy signal adding unit adds the dummy signal by reversible pixel value conversion.

15. The image encrypting apparatus according to claim 14, wherein
the dummy signal adding unit adds the dummy signal by performing an inverting process as the pixel value conversion.

16. The image encrypting apparatus according to claim 14, wherein
the dummy signal adding unit adds the dummy signal by performing a shift operation as the pixel value conversion.

17. The image encrypting apparatus according to claim 14, wherein
the dummy signal adding unit adds the dummy signal by performing an exclusive logical sum with adjacent micro areas.

18. The image encrypting apparatus according to claim 13, wherein
the dummy signal adding unit adds the dummy signal by irreversible pixel value conversion.

19. The image encrypting apparatus according to claim 13, wherein
the dummy signal adding unit converts a first pixel component into a second pixel component of the pixel to be added with the dummy signal, the dummy signal adding unit converting a part or all of the pixel values of the second pixel component, and the unit, thereafter, creating the dummy signal by reversely converting the part or the all of the pixel values of the second pixel component into the first pixel component.

20. The image encrypting apparatus according to claim 13, wherein
the dummy signal adding unit adds the dummy signal having a shape such as a point or a line that is removable by an interpolating process or filtering when the image is decrypted.

21. The image encrypting apparatus according to claim 13, wherein
the dummy signal adding unit adds the dummy signal that is detectable by pattern matching.

22. The image encrypting apparatus according to claim 13, wherein
the dummy signal adding unit adds a portion in the original of the digital image as the dummy signal.

23. The image encrypting apparatus according to claim 13, wherein
the dummy signal adding unit adds a portion in the original of the digital image as the dummy signal.

24. The image encrypting apparatus according to claim 13, wherein
the dummy signal adding unit adds the dummy signal only in a blank area in an image.

25. An image decrypting apparatus for decrypting the image encrypted by the image encrypting apparatus according to claim 13, the image decrypting apparatus comprising a dummy signal removing unit that removes the dummy signal from the encrypted image.

26. The image decrypting apparatus according to claim 25, wherein
the dummy signal removing unit removes the dummy signal by an interpolating process or filtering.

27. The image decrypting apparatus according to claim 25, wherein
the dummy signal removing unit detects the dummy signal by pattern matching.

28. An image encrypting apparatus for encrypting an image using an encryption key, comprising:
an encrypting area designating unit that designates a partial area to be encrypted from the image;
an image converting unit that converts the partial area designated by the encryption area designating unit into a processed image based on the encryption key; and
a marker adding unit that adds a positioning marker to specify a position of the partial area, the positioning marker having a texture which is constructed by lines or points and the texture has a predetermined specific frequency.

29. A method for encrypting an image using an encryption key in an image encrypting apparatus, comprising:
designating a partial area to be encrypted from the image;
converting the designated partial area into a processed image based on the encryption key; and
adding a positioning marker to specify a position of the partial area, the positioning marker having a texture which is constructed by lines or points and the texture has a predetermined specific frequency.

30. A computer program product having a non-transitory computer readable medium including programmed instructions for encrypting an image using an encryption key, wherein the instructions, when executed by a computer, cause the computer to perform:
designating a partial area to be encrypted from the image;
converting the designated partial area into a processed image based on the encryption key; and
adding a positioning marker to specify a position of the partial area, the positioning marker having a texture which is constructed by lines or points and the texture has a predetermined specific frequency.

* * * * *